US010449700B2

(12) United States Patent
Ausen et al.

(10) Patent No.: US 10,449,700 B2
(45) Date of Patent: Oct. 22, 2019

(54) METHODS OF MAKING FILMS COMPRISING AN ARRAY OF OPENINGS

(71) Applicant: 3M INNOVATIVE PROPERTIES COMPANY, St. Paul, MN (US)

(72) Inventors: Ronald W. Ausen, St. Paul, MN (US); Thomas P. Hanschen, Mendota Heights, MN (US); William J. Kopecky, Hudson, WI (US); Thomas L. Wood, Hudson, WI (US); Wei Zhang, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 310 days.

(21) Appl. No.: 15/269,223

(22) Filed: Sep. 19, 2016

(65) Prior Publication Data

US 2017/0001342 A1 Jan. 5, 2017

Related U.S. Application Data

(62) Division of application No. 14/387,332, filed as application No. PCT/US2013/030143 on Mar. 11, 2013.

(Continued)

(51) Int. Cl.
*B65B 17/02* (2006.01)
*B29C 43/22* (2006.01)
(Continued)

(52) U.S. Cl.
CPC ............ *B29C 43/222* (2013.01); *B29C 43/24* (2013.01); *B29D 7/01* (2013.01); *B29D 28/00* (2013.01);
(Continued)

(58) Field of Classification Search
CPC ..... B29C 43/222; B29C 43/24; B29C 47/003; B29C 47/0021; B29C 47/8845;
(Continued)

(56) References Cited

U.S. PATENT DOCUMENTS 2,053,173 A 9/1936 Astima
3,012,275 A 12/1961 Nalle, Jr.
(Continued)

FOREIGN PATENT DOCUMENTS

DE 2440846 3/1976
EP 0097496 1/1984
(Continued)

OTHER PUBLICATIONS

International Search Report for PCT International Application No. PCT/US2013/030143, dated Jun. 11, 2013, 3pgs.
Machine Translation of DE 2440846 A1, Mar. 1979.

*Primary Examiner* — Galen H Hauth
(74) *Attorney, Agent, or Firm* — James A. Baker; Gregory D. Allen

(57) ABSTRACT

Polymeric layer having first and second, generally opposed major surfaces, comprising an array of openings extending between the first and second major surfaces. The polymeric layers are useful, for example, as components in personal care garments such as diapers and feminine hygiene products. They can also be useful for filtering (including liquid filtering) and acoustic applications.

13 Claims, 17 Drawing Sheets

Related U.S. Application Data

(60) Provisional application No. 61/615,676, filed on Mar. 26, 2012.

(51) Int. Cl.
  *B29D 28/00* (2006.01)
  *B29D 7/01* (2006.01)
  *B29C 43/24* (2006.01)
  *B29L 28/00* (2006.01)

(52) U.S. Cl.
  CPC .... *B29L 2028/00* (2013.01); *Y10T 428/24273* (2015.01); *Y10T 428/24314* (2015.01)

(58) Field of Classification Search
  CPC ....... B29D 28/00; B29D 7/01; B29L 2028/00; Y10T 428/24273; Y10T 428/24314
  See application file for complete search history.

(56) References Cited

U.S. PATENT DOCUMENTS

| | | |
|---|---|---|
| 3,019,147 A | 1/1962 | Nalle, Jr. |
| 3,032,008 A | 5/1962 | Land |
| 3,054,148 A | 9/1962 | Zimmerli |
| 3,178,328 A | 4/1965 | Tittmann |
| 3,302,501 A | 2/1967 | Greene |
| 3,394,211 A | 7/1968 | MacDuff |
| 3,471,588 A | 10/1969 | Kanner |
| 3,471,597 A | 10/1969 | Schirmer |
| 3,524,789 A | 8/1970 | Olsen |
| 3,831,741 A | 8/1974 | Poupitch |
| 3,968,621 A | 7/1976 | Poupitch |
| 4,038,008 A | 7/1977 | Larsen |
| 4,064,306 A * | 12/1977 | Scotchmer ............... D04H 3/00 156/181 |
| 4,123,491 A | 10/1978 | Larsen |
| 4,144,371 A | 3/1979 | Okie |
| 4,152,479 A | 5/1979 | Larsen |
| 4,355,065 A | 10/1982 | DeMott |
| 4,384,022 A | 5/1983 | Fowler |
| 4,472,328 A | 9/1984 | Sugimoto |
| 4,621,898 A | 11/1986 | Cohen |
| 4,634,485 A * | 1/1987 | Welygan ............... B29C 47/003 156/244.11 |
| 4,636,419 A | 1/1987 | Madsen |
| 4,656,075 A | 4/1987 | Mudge |
| 4,661,389 A | 4/1987 | Mudge |
| 4,732,723 A | 3/1988 | Madsen |
| 4,933,081 A | 6/1990 | Sasaki |
| 5,077,870 A | 1/1992 | Melbye |
| 5,660,778 A | 8/1997 | Ketcham |
| 5,679,379 A | 10/1997 | Fabbricante |
| 5,728,469 A | 3/1998 | Mann |
| 5,811,186 A | 9/1998 | Martin |
| 5,948,517 A | 9/1999 | Adamko |
| 5,972,463 A | 10/1999 | Martin |
| 6,074,505 A | 6/2000 | Ouellette |
| 6,083,856 A | 7/2000 | Joseph |
| 6,093,663 A | 7/2000 | Ouellette |
| 6,228,449 B1 | 5/2001 | Meyer |
| 6,240,817 B1 | 6/2001 | James |
| 6,348,249 B2 | 2/2002 | Meyer |
| 6,391,420 B1 | 5/2002 | Cederblad |
| 6,398,370 B1 | 6/2002 | Chiu |
| 6,465,107 B1 | 10/2002 | Kelly |
| 6,649,807 B2 | 11/2003 | Mizutani |
| 6,692,606 B1 | 2/2004 | Cederblad |
| 6,994,904 B2 | 2/2006 | Joseph |
| 7,329,621 B2 | 2/2008 | Collier, IV |
| 7,335,273 B2 | 2/2008 | Neculescu |
| 7,467,873 B2 | 12/2008 | Clarke |
| 8,329,976 B2 | 12/2012 | Freiding |
| 8,758,882 B2 | 6/2014 | Ausen |
| 2001/0008690 A1 | 7/2001 | Okamoto |
| 2009/0136711 A1 | 5/2009 | Tomino |
| 2010/0120309 A1 | 5/2010 | Arnold |
| 2011/0092123 A1 | 4/2011 | Gupta |
| 2013/0004723 A1 | 1/2013 | Ausen |
| 2013/0004729 A1 | 1/2013 | Ausen |
| 2013/0009336 A1 | 1/2013 | Ausen |
| 2013/0011600 A1 | 1/2013 | Ausen |
| 2014/0050883 A1 | 2/2014 | Hanschen |
| 2015/0079337 A1 | 3/2015 | Ausen |

FOREIGN PATENT DOCUMENTS

| | | |
|---|---|---|
| EP | 0749736 | 12/1996 |
| EP | 0749737 | 12/1996 |
| ES | 2241474 | 10/2005 |
| GB | 2262906 | 7/1993 |
| JP | S 38-15074 | 8/1963 |
| JP | 52-031459 | 3/1977 |
| JP | 61189927 | 8/1986 |
| WO | WO 97/00057 | 1/1997 |
| WO | WO 2012/112768 | 8/2012 |
| WO | WO 2013/028654 | 2/2013 |
| WO | WO 2013/032683 | 3/2013 |
| WO | WO 2013/052371 | 4/2013 |

* cited by examiner

220μm

310μm

260μm

270μm

METHODS OF MAKING FILMS COMPRISING AN ARRAY OF OPENINGS

CROSS REFERENCE TO RELATED APPLICATIONS

This application is divisional application of prior Application Ser. No. 14/387,332, filed Sep. 23, 2014, which is a national stage filing under 35 U.S.C. 371 of PCT/US2013/030143, filed Mar. 11, 2013, which claims priority to U.S. Provisional Application No. 61/615,676, filed Mar. 26, 2012, the disclosure of which is incorporated by reference in its/their entirety herein.

BACKGROUND

Macroporous, perforated films are commonly used for vapor and liquid permeable applications, whereas microporous perforated films are useful for vapor permeable applications, but not liquid permeable applications. Macroporous perforated films are commonly used as components in personal care garments (e.g., diapers and feminine hygiene products). Perforated films are also used in filtering, and acoustic applications.

Macroporous permeable films are commonly made by first producing a continuous film and then subjecting the film to a perforation process. Mechanical perforating devices include intermeshing rollers, die punching, or needlepunching. Films can also be perforated using perforated rollers having thermal zones or lasers that melt perforations into the film. Other techniques for providing the perforations include casting a film on to a porous quench roll that has vacuum on the holes to pull the melt into the hole and produce an aperture, using electrical corona treatment to create perforations by localized energy treatment, and creating perforations is by blending immiscible materials followed by film stretching to create perforations by generation of film voids. It is also known that after quenching polypropylene in to beta phase crystals, upon orientation, the film will become porous.

There exists a need for additional techniques, preferably relatively simple and economical, to make macroporous layers (including films and sheets).

SUMMARY

In one aspect, the present disclosure describes a polymeric layer having first and second, generally opposed major surfaces, comprising an array of openings extending between the first and second major surfaces, wherein the openings each have a series of areas through the openings from the first and second major surfaces ranging from minimum to maximum areas, wherein there is a total area and a total open area for each of the first and second major surfaces, wherein the total open area for each of the first and second major surfaces is not greater than 50 (in some embodiments, not greater than 45, 40, 35, 30, 25, 20, 15, 10, 5, 4, 3, 2, 1, 0.75, 0.5, 0.25, or even not greater than 0.1; in some embodiments, in a range from 0.1 to not greater than 50, 0.1 to not greater than 45, 0.1 to not greater than 40, 0.1 to not greater than 35, 0.1 to not greater than 30, 0.1 to not greater than 25, 0.1 to not greater than 20, 0.1 to not greater than 15, 0.1 to not greater than 10, or even 0.1 to not greater than 5) percent of the total area of the respective major surface, and wherein for at least a majority of the openings, the minimum area is not at either major surface. In some embodiments, for at least a majority of the openings, the area of each opening is not greater than 5 (in some embodiments, not greater than 2.5, 2, 1, 0.5, 0.1, 0.05, 0.01, 0.075, or even not greater than 0.005) $mm^2$.

In another aspect, the present disclosure describes a polymeric layer having first and second, generally opposed major surfaces, comprising an array of openings extending between the first and second major surfaces, wherein the openings each have a series of areas through the openings from the first and second major surfaces ranging from minimum to maximum areas, wherein for at least a majority of the openings, the area of each opening is not greater than is 5 (in some embodiments, not greater than 2.5, 2, 1, 0.5, 0.1, 0.05, 0.01, 0.075, or even not greater than 0.005) $mm^2$, and wherein for at least a majority of the openings, the minimum area is not at either major surface.

In another aspect, the present disclosure describes a method of making a polymeric layer described herein, the method comprising at least one of passing through a nip or calendaring netting comprising an array of polymeric strands periodically joined together at bond regions throughout the array.

In another aspect, the present disclosure describes a method of making a polymeric layer having openings therein, the method comprising at least one of passing through a nip or calendaring a netting comprising an array of polymeric strands periodically joined together at bond regions throughout the array, wherein the netting has a thickness up to 2 mm (in some embodiments, up to 1.5 mm, 1 mm, 750 micrometers, 500 micrometers, 250 micrometers, 100 micrometers, 75 micrometers, 50 micrometers, or even up to 25 micrometers; in a range from 10 micrometers to 2 mm, 10 micrometers to 1.5 mm, 10 micrometers to 1 mm, 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers).

Polymeric layers described herein are useful, for example, as components in personal care garments such as diapers and feminine hygiene products. They can also be useful for filtering (including liquid filtering) and acoustic applications.

DETAILED DESCRIPTION

Figure 1:
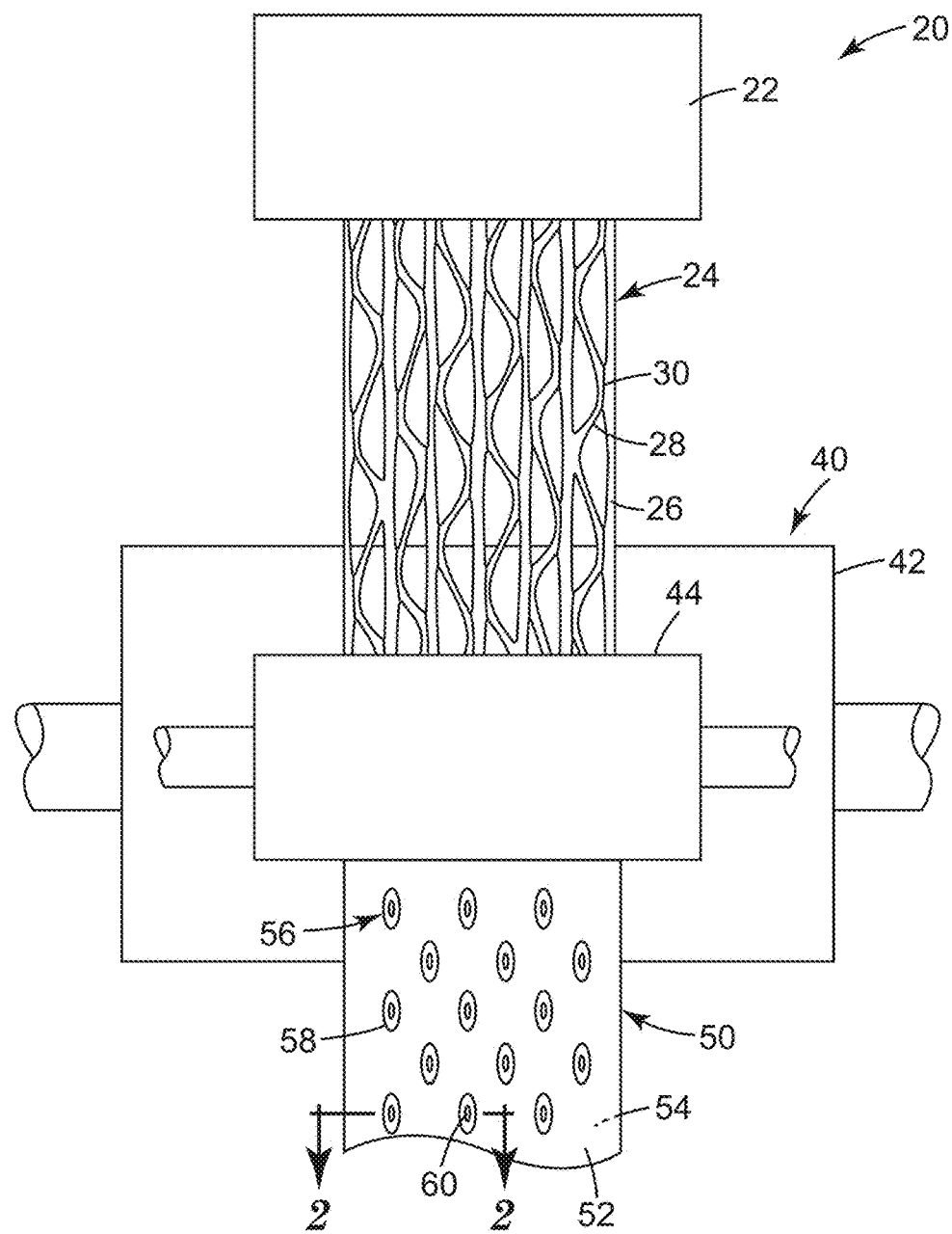
FIG. 1 is a schematic view of an apparatus for making forming polymeric layers having openings therein as described herein.

Referring to FIG. 1, exemplary apparatus 20 for making a polymeric layer having openings therein is shown. Apparatus 20 has extruder 22 extruding polymeric netting 24 comprising first strands 26 and second strands 28 joined together at bond regions 30. Any of a variety of nettings comprising an array of polymeric strands periodically joined together at bond regions throughout the array, including those known in the art (see, e.g., U.S. Pat. No. 4,038,008 (Larsen)) may be used. Useful polymeric netting is also described in copending applications having U.S. Ser. Nos. 61/526,001, filed Aug. 22, 2011 and 61/530,521, filed Sep. 2, 2011, the disclosures of which are incorporated herein by reference.

As shown, polymeric netting 24 is extruded vertically, into nip 40. Nip 40 includes backup roll 42, and nip roll 44. In some embodiments, backup roll 42 is a smooth, chrome-plated steel roll and nip roll 44 is a silicone rubber roll. In some embodiments, both backup roll 42 and nip roll 44 are temperature controlled with, for example, internal water flow.

In some embodiments, for example the one depicted here, polymeric netting 24 passes directly into nip 40, and nip 40 is a quench nip. However, this is not considered necessary, and the extrusion of the netting and the entry into the nip need not be immediately sequential.

After passing through nip 40, polymeric netting 24 has been transformed into polymeric layer having openings therein 50. In some embodiments, it may be advantageous to allow polymeric layer 50 to remain wrapped around backup roll 42 for at least a portion of its circumference. Polymeric layer 50 has first major surface 52 on the side towards the viewer, and second major surface 54 on the side opposite from the viewer. Numerous openings 56 pass through polymeric layer 50 from first major surface 52 to second major surface 54. In some embodiments, openings 56 have well-formed, smooth edges 58. Further, in some embodiments, openings 56 taper inwards from both first major surface 52 and second major surface 54 so that opening 56 has a minimum area 60 somewhere in the interior of polymeric layer 50.

Figure 2:
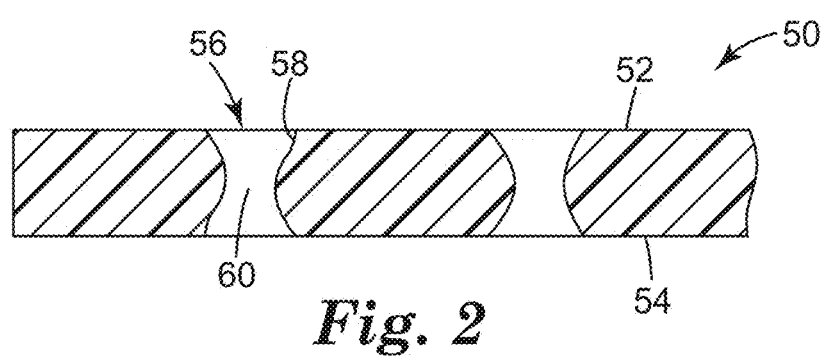
FIG. 2 is a cross-section view of the forming polymeric layer having openings therein as described herein taken along section lines 2-2 in FIG. 1.

These features of openings 56 can be better appreciated in FIG. 2, which is a cross-section view of polymeric layer 50 taken along section lines 2-2 in FIG. 1. Here it can be seen that openings 56 have well-formed, smooth edges 58. Openings 56 taper inwards from both first major surface 52 and second major surface 54. The point where opening 56 tapers down to a minimum area 60 is shown to be in the interior of polymeric layer 50. In some embodiments, individual openings 56 range from 0.005 $mm^2$ to 5 $mm^2$, and further, for at least a majority of openings 56, the minimum area is not at either major surface 52 or 54.

Figure 3:
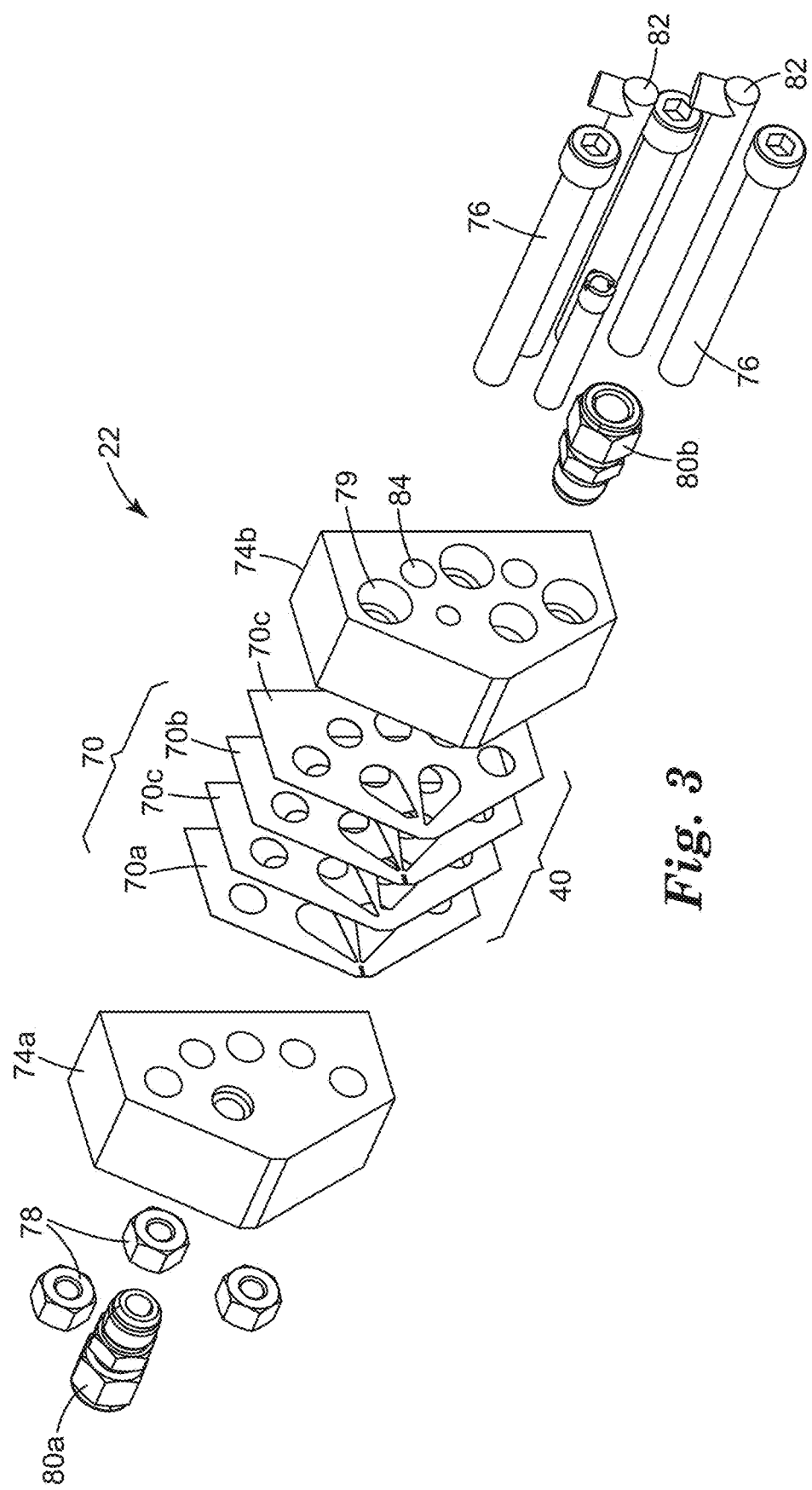
FIG. 3 is an exploded perspective view of an exemplary embodiment of a set of extrusion die elements suitable for use in the apparatus of FIG. 1, including a plurality of shims, a set of end blocks, bolts for assembling the components, and inlet fittings for the materials to be extruded.

As mentioned above, diverse types of netting, produced by any of a variety of techniques may be used in connection to make the polymeric layers having openings therein as described herein. However, extruders 22 that were employed to prepare the Examples recited below will be described with more particularity. Referring to FIG. 3, an exploded view of an exemplary extrusion die 22 is illustrated. Extrusion die 22 includes plurality of shims 70. In some embodiments of extrusion dies described herein, there will be a large number of very thin shims 40 (typically several thousand shims; in some embodiments, at least 1000, 2000, 3000, 4000, 5000, 6000, 7000, 8000, 9000, or even at least 10,000), of diverse types (e.g., shims 70a, 70b, and 70c), compressed between two end blocks (e.g., 74a and 74b). Conveniently, fasteners (e.g., through bolts 76 threaded onto nuts 78) are used to assemble the components for extrusion die 22 by passing through holes 79. Inlet fittings 80a and 80b are provided on end blocks 74a and 74b respectively to introduce the materials to be extruded into extrusion die 22. In some embodiments, inlet fittings 80a and 80b are connected to melt trains of conventional type. In some embodiments, cartridge heaters 82 are inserted into receptacles 84 in extrusion die 22 to maintain the materials to be extruded at a desirable temperature while in the die.

Figure 4:
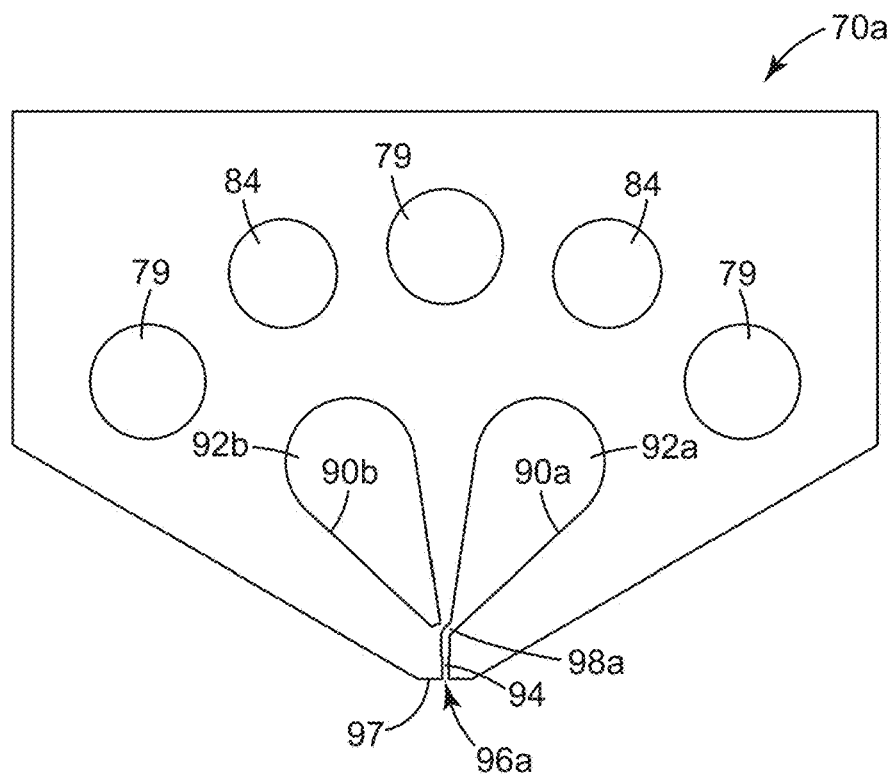
FIG. 4 is a plan view of one of the shims of FIG. 3.

Referring now to FIG. 4, a plan view of shim 70a from FIG. 3 is illustrated. Shim 70a has first aperture 90a and second aperture 90b. When extrusion die 22 is assembled, first apertures 90a in shims 70 together define at least a portion of first cavity 92a. Similarly, second apertures 90b in shims 70 together define at least a portion of second cavity 92b. Material to be extruded conveniently enters first cavity 92a via inlet port 80a, while material to be extruded conveniently enters second cavity 92b via inlet port 80b. Shim 70a has duct 94 ending in first dispensing orifice 96a in a dispensing surface 97. Shim 70a further has passageway 98a affording a conduit between first cavity 92a and duct 94. The dimensions of duct 94, and especially first dispensing orifice 96a at its end, are constrained by the dimensions desired in the polymer strands extruded from them. Since the strand speed of the strand emerging from first dispensing orifice 96a is also of significance, manipulation of the pressure in cavity 92a and the dimensions of passageway 98a can be used to set the desired strand speed.

Figure 5:
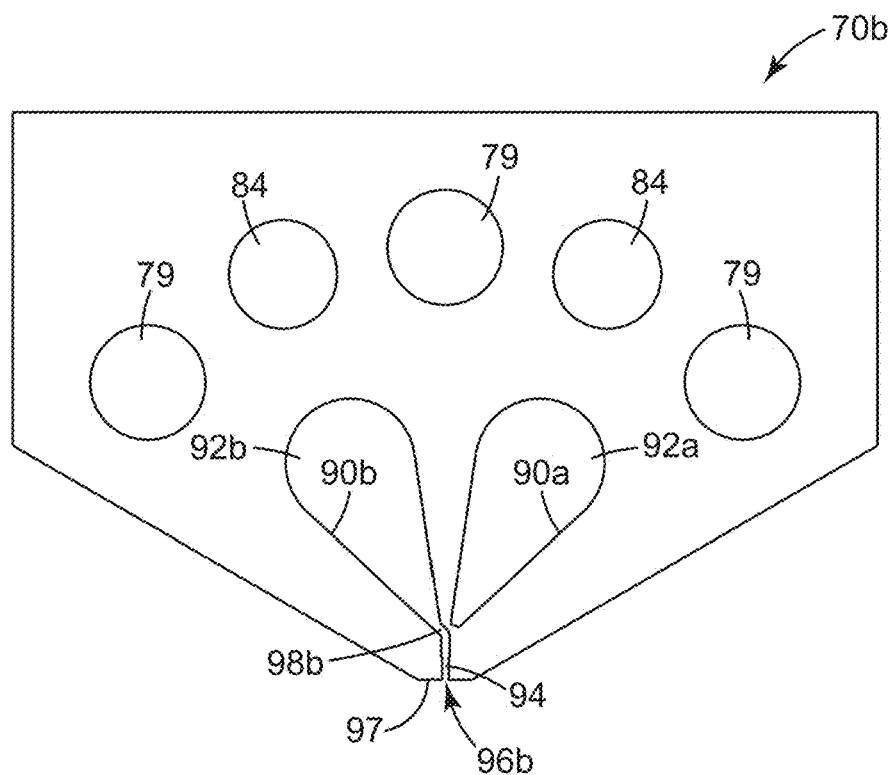
FIG. 5 is a plan view of a different one of the shims of FIG. 3.

Referring now to FIG. 5, shim 70b is a reflection of shim 70a, having a passageway instead affording a conduit between second cavity 92b and second dispensing orifice 96.

Figure 6:
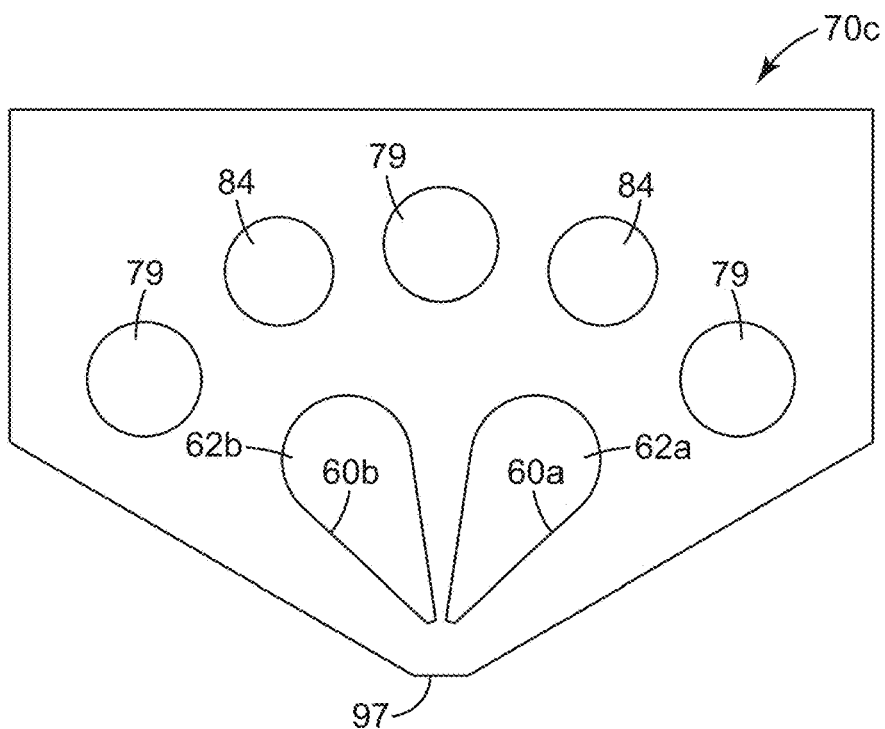
FIG. 6 is a plan view of a different one of the shims of FIG. 3.

Referring now to FIG. 6, a plan view of shim 70c from FIG. 3 is illustrated. Shim 70c has no passageway between either of first or second cavities 92a and 92b, respectively, and no duct opening onto dispensing surface 97.

Figure 7:
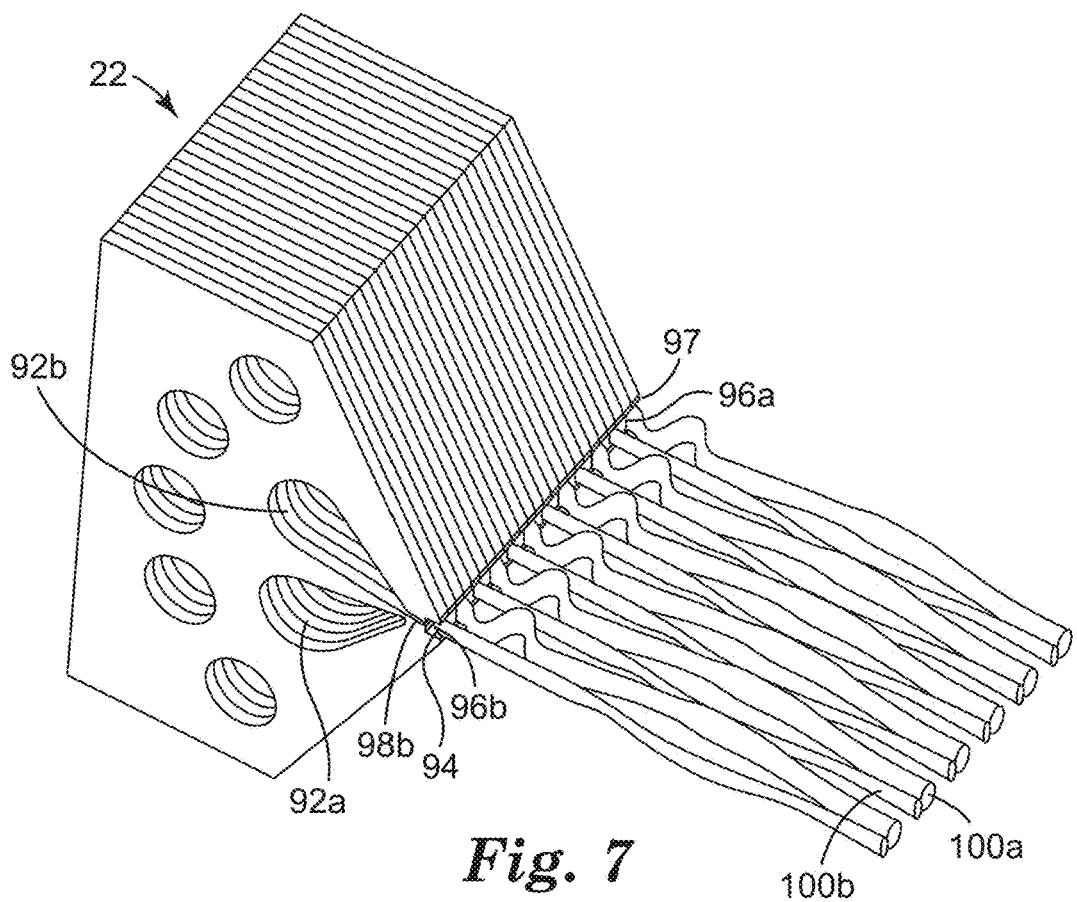
FIG. 7 is a schematic perspective view of a portion of the extrusion die of FIG. 3, supplied with polymeric material and forming a netting.

Referring now to FIG. 7, a schematic perspective view of a portion of extrusion die 22 is illustrated, supplied with polymeric material and forming a net. Polymer from first cavity 92a emerges as first strands 100a from first dispensing orifices 96a, and second strands 100b are emerging from second dispensing orifices 96b. Passageways 98a (hidden behind the nearest shim in this view) and 98b, and the pressures in cavities 92a and 92b are typically selected so that the strand speed of first strands 100a are between about 2 and 6 times greater than the strand speed of second strands 100b. As explained more fully in copending application having U.S. Ser. No. 61/526,001, filed Aug. 22, 2011, the disclosure of which is incorporated herein by reference, this allows polymeric netting 24 to be formed.

Figure 7A:
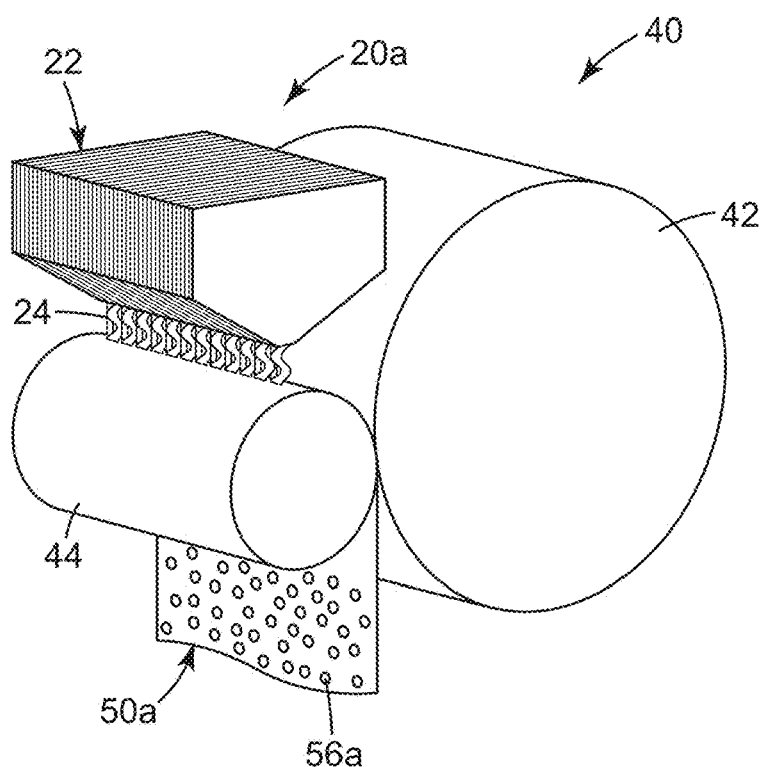
FIG. 7a is a schematic perspective view of an alternate arrangement of the extrusion die relative to the nip.

Referring now to FIG. 7a, a schematic perspective view of another exemplary apparatus 20a with a different arrangement of extrusion die 22 relative to the nip 40 is shown. In alternate apparatus 20a, extrusion die 22 is positioned so that the polymeric netting 24 is dispensed onto nip roller 44 and carried on that roller into the nip between nip roller 44 and backup roller 42. By positioning extrusion die 22 quite close to nip roller 44, there is little time for the strands that make up polymeric netting 24 to sag and extend under the force of gravity. An advantage provided by this positioning is that openings 56a in polymeric layer 50a tend to be rounder. More in this regard can be achieved by extruding not only very close to one of the rolls forming nip 40, but also at an extrusion speed similar to the circumferential speed of that roll.

Figure 7B:
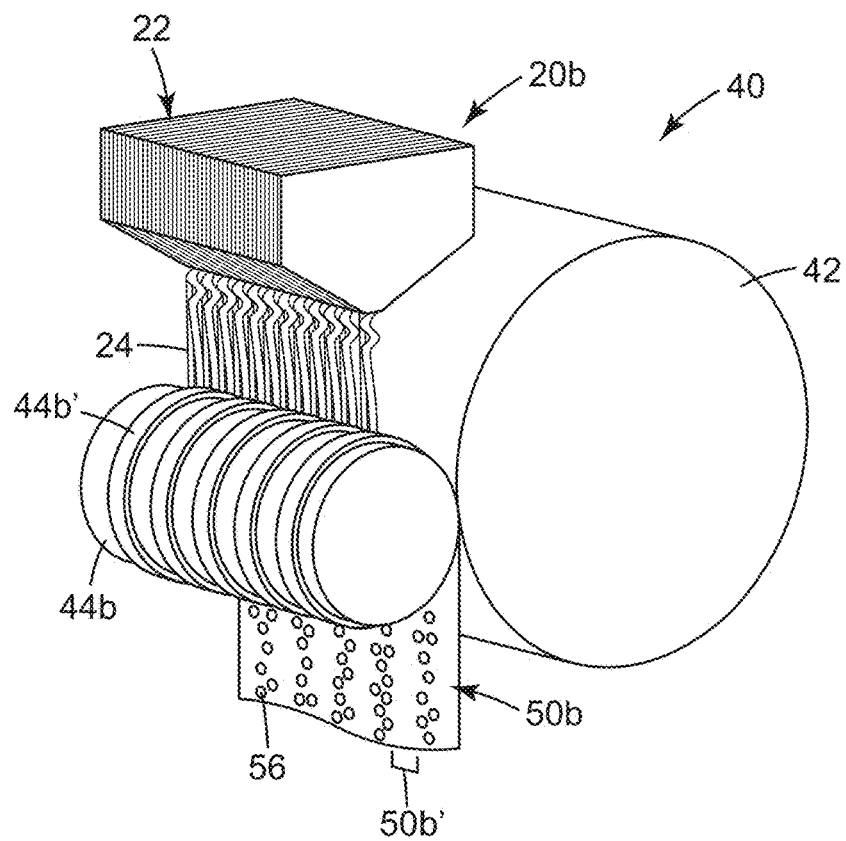
FIG. 7b is a schematic perspective view of an alternate nip roll.

Referring now to FIG. 7b, a schematic perspective view of another exemplary apparatus 20b with an alternate nip roll 44b is shown. The surface of alternate nip roll 44b includes raised areas 44b' which apply more nipping force on polymeric netting 24 against backup roll 42 than the other areas of nip roll 44b. In the depicted embodiment, enough force has been applied by raised areas 44b' that openings 56 in polymeric layer 50b are separated by longitudinal bands 50b' of solid layer where the potential openings have been crushed completely closed within nip 40. Rather than raised areas, one or both of the rolls comprising the nip may have zones of different temperature, giving rise to longitudinal bands having no openings or different sized openings. Further, the relative thickness of the extruded polymeric netting has been found to affect the range of hole sizes; with a relatively thick netting it is easier to nip the melt to form longitudinal bands 50b' of solid film. In some embodiments, it may be desired to quench one side of the film at a faster rate than the other, in order to affect the shape of the opening's cross-section.

In some embodiments, it may be desirable to pattern one side or both sides of the layer. This can be achieved, for example, using patterning the surface of one or both of nip roller 44 and backup roller 42. It has been shown in the field of polymeric hook forming that the use of patterned rolls can preferentially move polymer in the cross direction or down-web direction. This concept can be used to shape the hole on one or both sides of the layer.

Exemplary polymeric materials from which the netting can be made includes thermoplastic resins comprising polyolefins (e.g., polypropylene and polyethylene), polyvinyl chloride, polystyrene, nylons, polyesters (e.g., polyethylene terephthalate) and copolymers and blends thereof; elastomeric materials (e.g., ABA block copolymers, polyurethanes, polyolefin elastomers, polyurethane elastomers, metallocene polyolefin elastomers, polyamide elastomers, ethylene vinyl acetate elastomers, and polyester elastomers); adhesives such as acrylate copolymer pressure sensitive adhesives, rubber based adhesives (e.g., those based on natural rubber, polyisobutylene, polybutadiene, butyl rubbers, and styrene block copolymer rubbers), adhesives based on silicone polyureas or silicone polyoxamides, polyurethane type adhesives, and poly(vinyl ethyl ether), and copolymers or blends of these. Other desirable materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefins, polyimides, mixtures and/or combinations thereof.

In some embodiments, netting used to make polymeric layers described herein include alternating first and second polymeric strands, wherein the second polymeric strands comprise a second, different polymer.

In some embodiments, polymeric materials of nettings used to make polymeric layers described herein comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the (e.g., to achieve desired color, tone, opacity, transmissivity, etc.). If desired, the polymeric materials may be formulated to have the same or different colors. When colored strands are of a relatively fine (e.g., less than 50 micrometers) diameter, the appearance of the web may have a shimmer reminiscent of silk.

In some embodiments, the polymeric strands have an average width in a range from 10 micrometers to 500 micrometers (in a range from 10 micrometers to 400 micrometers, or even 10 micrometers to 250 micrometers).

In some embodiments, nettings used to make polymeric layers described herein have a basis weight in a range from 5 g/m² to 400 g/m² (in some embodiments, 10 g/m² to 200 g/m²).

In some embodiments, nettings used to make polymeric layers described herein have a strand pitch in a range from 0.5 mm to 20 mm (in some embodiments, in a range from 0.5 mm to 10 mm).

In some embodiments, strands of netting used to make polymeric layers described herein do not substantially cross over each other (i.e., at least 50 (at least 55, 60, 65, 70, 75, 80, 85, 90, 95, 99, or even 100) percent by number).

In some embodiments, nettings used to make polymeric layers described herein have alternating first and second polymeric strands exhibiting at least one of diamond-shaped or hexagonal-shaped openings.

In some embodiments, polymeric strands of netting used to make polymeric layers described herein have an average width in a range from 10 micrometers to 500 micrometers (in a range from 10 micrometers to 400 micrometers, or even 10 micrometers to 250 micrometers).

In some embodiments, polymeric strands of netting used to make polymeric layers described herein are elastic.

In some embodiments, nettings used to make polymeric layers described herein are made of, or coated with, hydrophilic material to make them absorbent. In some embodiments, nettings described herein are useful as wound absorbants to remove excess exudate from wounds, and in some embodiments, nettings described herein are made of bioresorbable polymers.

Polymeric layers described herein can be made, for example, at least one of passing through a nip or calendaring netting comprising an array of polymeric strands periodically joined together at bond regions throughout the array.

In forming polymeric layers described herein, it has been observed that the temperature of the melt and the temperature of the quench, and the thickness of the melt affect the size of the holes. Higher melt temperature allows more movement of polymer in the nip which tends to create smaller hole sizes. Low temperature quenching has been shown to limit the amount of polymer movement which creates larger hole sizes.

In some embodiments, polymeric layers described herein have a total open area for each of the first and second, generally opposed major surfaces is not greater than 50 (in some embodiments, not greater than 45, 40, 35, 30, 25, 20. 15, 10, 5, 4 3, 2, 1, 0.75, 0.5, 0.25, or even not greater than 0.1) percent of the total area of the respective major surface. In some embodiments. for at least a majority of the openings, the area of each opening is not greater than is 5 (in some embodiments, not greater than 2.5, 2, 1, 0.5, 0.1, 0.05, 0.01, 0.075, or even not greater than 0.005) mm².

In some embodiments, for polymeric layers described herein have in a range from 50,000 to 6,000,000 (in some embodiments, 100,000 to 6,000,000, 500,000 to, 6,000,000, or even 1,000,000 to 6,000,000) openings/m².

In some embodiments, for polymeric layers described herein the openings have widths in a range from 5 micrometers to 1 mm (in some embodiments, 10 micrometers to 0.5 mm). In some embodiments, for polymeric layers described herein the openings have lengths in a range from 100 micrometers to 10 mm (in some embodiments, 100 micrometers to 1 mm). In some embodiments, for polymeric layers described herein the openings have a length to width ratio in a range from 1:1 to 100:1, (in some embodiments, 1:1 to 1.9:1, 2:1 to 100:1 2:1 to 75:1, 2:1 to 50:1, 2:1 to 25:1, or even, 2:1 to 10:1).

In some embodiments, the openings have at least two pointed ends. In some embodiments, at least some of the openings are elongated with two pointed ends. In some embodiments, at least some of the openings are elongated with two opposed pointed ends. In some embodiments, at least some of the openings are ovals.

In some embodiments, for polymeric layers described herein have a thickness up to 2 mm (in some embodiments, up to 1 mm, 500 micrometers, 250 micrometers, 100 micrometers, 75 micrometers, 50 micrometers, or even up to 25 micrometers; in a range from 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers. In some embodiments, for polymeric layers described herein are sheets having an average thickness in a range from 250 micrometers to 5 mm. In some embodiments, for polymeric layers described herein are films having an average thickness not greater than 5 mm.

In some embodiments, for polymeric layers described herein at least some of the openings have a first side on the first major surface comprising a first polymeric material and a second, opposed side on the first major surface comprising a second, different polymeric material. In some embodiments, at least one of the first or second polymeric materials are thermoplastic (e.g., nylons, polyesters, polyolefins, polyurethanes, elastomers (e.g., styrenic block copolymers), and blends thereof).

In some embodiments, for polymeric layers described herein have a basis weight in a range from 25 g/m² to 500 g/m² (in some embodiments, 50 g/m² to 250 g/m²)

Polymeric layers described herein are useful, for example, for as components in personal care garments such as diapers and feminine hygiene products. They can also be useful for filtering (including liquid filtering) and acoustic applications.

Exemplary Embodiments

1A. A polymeric layer having first and second, generally opposed major surfaces, comprising an array of openings extending between the first and second major surfaces, wherein the openings each have a series of areas through the openings from the first and second major surfaces ranging from minimum to maximum areas, wherein there is a total area and a total open area for each of the first and second major surfaces, wherein the total open area for each of the first and second major surfaces is not greater than 50 (in some embodiments, not greater than 45, 40, 35, 30, 25, 20, 15, 10, 5, 4, 3, 2, 1, 0.75, 0.5, 0.25, or even not greater than 0.1) percent of the total area of the respective major surface, and wherein for at least a majority of the openings, the minimum area is not at either major surface.

2A. The polymeric layer of Embodiment 1A, wherein the total open area for each of the first and second major surfaces is in a range from 0.1 percent to not greater than 50 percent (in some embodiments, in a range from 0.1 percent to not greater than 45 percent, 0.1 percent to not greater than 40 percent, 0.1 percent to not greater than 35 percent, 0.1 percent to not greater than 30 percent, 0.1 percent to not greater than 25 percent, 0.1 percent to not greater than 20 percent, 0.1 percent to not greater than 15 percent, 0.1 percent to not greater than 10 percent, or even 0.1 percent to not greater than 5 percent) of the total area of the respective major surface.

3A. The polymeric layer of Embodiment 1A, wherein the total open area for each of the first and second major surfaces is not greater than 1 percent of the total area of the respective major surface.

4A. The polymeric layer of any preceding Embodiment A, wherein for at least a majority of the openings, the area of each opening is not greater than is 5 (in some embodiments, not greater than 2.5, 2, 1, 0.5, 0.1, 0.05, 0.01, 0.075, or even not greater than 0.005) mm$^2$.

5A. The polymeric layer of any preceding Embodiment A, wherein the openings have at least two pointed ends.

6A. The polymeric layer of any of Embodiments 1A to 4A, wherein at least some of the openings are elongated with two pointed ends.

7A. The polymeric layer of any of Embodiments 1A to 4A, wherein at least some of the openings are elongated with two opposed pointed ends.

8A. The polymeric layer of any of Embodiments 1A to 4A, wherein at least some of the openings are ovals.

9A. The polymeric layer of any preceding Embodiment A having in a range from 50,000 to 6,000,000 (in some embodiments, 100,000 to 6,000,000, 500,000 to, 6,000,000, or even 1,000,000 to 6,000,000) openings/m$^2$.

10A. The polymeric layer of any preceding Embodiment A, wherein the openings have a length and a width, and a ratio of lengths to widths in a range from 2:1 to 100:1 (in some embodiments, 2:1 to 75:1, 2:1 to 50:1, 2:1 to 25:1, or even, 2:1 to 10:1).

11A. The polymeric layer of any of Embodiments 1A to 9A, wherein the openings have a length and a width, and a ratio of lengths to widths in a range from 1:1 to 1.9:1.

12A. The polymeric layer of any preceding Embodiment A, wherein the openings have widths in a range from 5 micrometers to 1 mm (in some embodiments, 10 micrometers to 0.5 mm).

13A. The polymeric layer of any preceding Embodiment A, wherein the openings have lengths in a range from 100 micrometers to 10 mm (in some embodiments, 100 micrometers to 1 mm).

14A. The polymeric layer of any preceding Embodiment A, wherein the layer has a thickness up to 2 mm (in some embodiments, up to 1 mm, 500 micrometers, 250 micrometers, 100 micrometers, 75 micrometers, 50 micrometers, or even up to 25 micrometers; in a range from 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers.

15A. The polymeric layer of any of Embodiments 1A to 13A, wherein the polymeric layer is a sheet having an average thickness in a range from 250 micrometers to 5 mm.

16A. The polymeric layer of any of Embodiments 1A to 13A, wherein the polymeric layer is a film having an average thickness not greater than 5 mm.

17A. The polymeric layer of any preceding Embodiment A, wherein at least some of the openings have a first side on the first major surface comprising a first polymeric material and a second, opposed side on the first major surface comprising a second, different polymeric material.

18A. The polymeric layer of Embodiment 17A, wherein at least one of the first or second polymeric materials are thermoplastic (e.g., nylons, polyesters, polyolefins, polyurethanes, elastomers (e.g., styrenic block copolymers), and blends thereof).

19A. The polymeric layer of any preceding Embodiment A having a basis weight in a range from 25 g/m$^2$ to 500 g/m$^2$ (in some embodiments, 50 g/m$^2$ to 250 g/m$^2$).

20A. The polymeric layer of any preceding Embodiment A comprising at least one of a dye or pigment therein.

21A. The polymeric layer of any preceding Embodiment A, further comprising a layer of adhesive thereon.

22A. A method of making a polymeric layer of any preceding Embodiment A, the method comprising at least one of passing through a nip or calendaring a netting comprising an array of polymeric strands periodically joined together at bond regions throughout the array.

1B. A polymeric layer having first and second, generally opposed major surfaces, comprising an array of openings extending between the first and second major surfaces, wherein the openings each have a series of areas through the openings from the first and second major surfaces ranging from minimum to maximum areas, wherein for at least a majority of the openings, the area of each opening is not greater than is 5 (in some embodiments, not greater than 2.5, 2, 1, 0.5, 0.1, 0.05, 0.01, 0.075, or even not greater than 0.005) mm$^2$, and wherein for at least a majority of the openings, the minimum area is not at either major surface.

2B. The polymeric layer of Embodiment 1B, wherein at least some of the openings have at least two pointed ends.

3B. The polymeric layer of either Embodiment 1B or 2B, wherein at least some of the openings are elongated with at least two pointed ends.

4B. The polymeric layer of either Embodiment 1B or 2B, wherein at least some of the openings are elongated with two opposed pointed ends.

5B. The polymeric layer of either Embodiment 1B or 2B, wherein at least some of the openings are oval.

6B The polymeric layer of any preceding Embodiment B having in a range from 50,000 to 6,000,000 (in some embodiments, 100,000 to 6,000,000, 500,000 to, 6,000,000, or even 1,000,000 to 6,000,000) openings/m$^2$.

7B. The polymeric layer of any preceding Embodiment B, wherein the openings have a length and a width, and a ratio of lengths to widths in a range from 2:1 to 100:1 (in some embodiments, 2:1 to 75:1, 2:1 to 50:1, 2:1 to 25:1, or even, 2:1 to 10:1).

8B. The polymeric layer of any of Embodiments 1B to 6B, wherein the openings have a length and a width, and a ratio of lengths to widths in a range from 1:1 to 1.9:1.

9B. The polymeric layer of any preceding Embodiment B, wherein the openings have widths in a range from 5 micrometers to 1 mm (in some embodiments, 10 micrometers to 0.5 mm).

10B. The polymeric layer of any preceding Embodiment B, wherein the openings have lengths in a range from 100 micrometers to 10 mm (in some embodiments, 100 micrometers to 1 mm).

11B. The polymeric layer of any preceding Embodiment B, wherein the layer has a thickness up to 2 mm (in some embodiments, up to 1 mm, 500 micrometers, 250 micrometers, 100 micrometers, 75 micrometers, 50 micrometers, or even up to 25 micrometers; in a range from 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers.

12B. The polymeric layer of any of Embodiments 1B to 10B, wherein the polymeric layer is a sheet having an average thickness in a range from 250 micrometers to 5 mm.

13B. The polymeric layer of any of Embodiments 1B to 10B, wherein the polymeric layer is a film having an average thickness not greater than 5 mm.

14B. The polymeric layer of any preceding Embodiment B, wherein at least some of the openings have a first side on the first major surface comprising a first polymeric material and a second, opposed side on the first major surface comprising a second, different polymeric material.

15B. The polymeric layer of Embodiment 14B, wherein at least one of the first or second polymeric materials are thermoplastic (e.g., nylons, polyesters, polyolefins, polyurethanes, elastomers (e.g., styrenic block copolymers), and blends thereof).

16B. The polymeric layer of any preceding Embodiment B having a basis weight in a range from 25 g/m² to 500 g/m² (in some embodiments, 50 g/m² to 250 g/m²).

17B. The polymeric layer of any preceding Embodiment B comprising at least one of a dye or pigment therein.

18B. The polymeric layer of any preceding Embodiment B, further comprising a layer of adhesive thereon.

19B. A method of making a polymeric layer of any preceding Embodiment B, the method comprising at least one of passing through a nip or calendaring netting comprising an array of polymeric strands periodically joined together at bond regions throughout the array.

1C. A method of making a polymeric layer having openings therein, the method comprising at least one of passing through a nip or calendaring netting comprising an array of polymeric strands periodically joined together at bond regions throughout the array, wherein the netting has a thickness up to 2 mm (in some embodiments, up to 1.5 mm, 1 mm, 750 micrometers, 500 micrometers, 250 micrometers, 100 micrometers, 75 micrometers, 50 micrometers, or even up to 25 micrometers; in a range from 10 micrometers to 2 mm, 10 micrometers to 1.5 mm, 10 micrometers to 1 mm, 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers).

2C. The method of Embodiment 1C, wherein the polymeric strands do not cross each other.

3C. The method of either Embodiment 1C or 2C, wherein the polymeric layer has a basis weight in a range from 25 g/m² to 500 g/m² (in some embodiments, 50 g/m² to 250 g/m² or 10 g/m² to 200 g/m²).

4C. The method of any preceding Embodiment C, wherein the netting has a strand pitch in a range from 0.5 mm to 20 mm (in some embodiments, in a range from 0.5 mm to 10 mm).

5C. The method of any preceding Embodiment C, wherein at least some of the polymeric stands include at least one of a dye or pigment therein.

6C. The method of any preceding Embodiment C, wherein at least some of the polymeric strands of the netting comprise a thermoplastic (e.g., nylons, polyesters, polyolefins, polyurethanes, elastomers (e.g., styrenic block copolymers), and blends thereof).

7C. The method of any preceding Embodiment C, wherein the plurality of strand of the netting include alternating first and second polymeric strands, wherein the second polymeric strands comprise a second, different polymer.

8C. The method of any preceding Embodiment C, wherein the nip or calendar has at least one of at least one raised area or at least two zones of different temperatures.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

Figure 8:
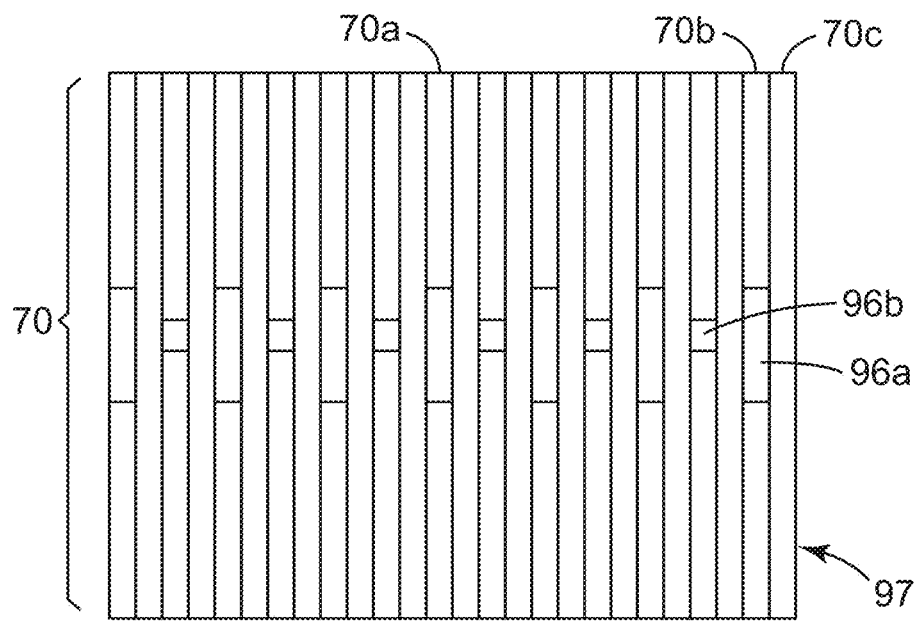
FIG. 8 is a close up front view of the dispensing surface of an extrusion die used in certain of the Examples.

A co-extrusion die as generally depicted in FIG. 3 and assembled with a 4 shim repeating pattern of extrusion orifices as generally illustrated in FIG. 7, was prepared. The thickness of the shims in the repeat sequence was 4 mils (0.102 mm) for shims 70 with connection to the first cavity, the second cavity, and for the spacers which had no connection to either cavity (70a, 70b and 70c, respectively). Shims 70 were formed from stainless steel, with perforations cut by a wire electron discharge machining. The height of dispensing orifices 96a fed by the first cavity was cut to 15 mils (0.381 mm). The height of dispensing orifices 96b fed by the second cavity was cut to 5 mils (0.127 mm). The extrusion orifices were aligned in a collinear, alternating arrangement, and resulting dispensing surface 97 was as shown in FIG. 8. The total width of the shim setup was 15 cm.

The inlet fittings on the two end blocks were each connected to a conventional single-screw extruder. A chill roll was positioned adjacent to the distal opening of the co-extrusion die to receive the extruded material. The extruder feeding the first cavity was loaded with thirty-five melt flow index polypropylene pellets (obtained under the trade designation "EXXONMOBIL 3155 PP" from Exxon-Mobil, Irving Tex.). The extruder feeding the second cavity was also loaded with thirty-five melt flow index polypropylene pellets ("EXXONMOBIL 3155 PP").

The melt was extruded vertically into an extrusion quench takeaway nip. The quench nip was a smooth temperature controlled chrome plated 20 cm diameter steel roll and an 11 cm diameter silicone rubber roll. The rubber roll was about 60 durometer. Both were temperature controlled with internal water flow. The nip pressure was generated with 2 pressurized air cylinders. The web path wrapped 180 degrees around the chrome steel roll and then to a windup roll. A schematic of the quench process is shown in FIG. 1.

Other process conditions are listed below:

| | |
|---|---|
| Orifice width for the first cavity: | 0.102 mm |
| Orifice height for the first cavity: | 0.381 mm |
| Orifice width of the second cavity: | 0.102 mm |
| Orifice height of the second cavity: | 0.127 mm |
| Land spacing between orifices | 0.102 mm |
| Flow rate of first polymer | 0.60 kg/hr. |
| Flow rate of second polymer | 0.64 kg/hr. |
| Extrusion temperature | 232° C. |
| Quench roll temperature | 65° C. |
| Quench takeaway speed | 3.1 m/min. |
| Melt drop distance | 5 cm |
| Nip Pressure | 0.1 kg/cm |

Using an optical microscope, the dimensions of the resulting polymeric layer having an array of openings between the major surfaces were measured, and are listed below.

| | |
|---|---|
| Layer thickness | 0.025 mm |
| Layer basis weight | 8 g/m² |
| Hole general shape | vesica piscis |
| Hole diameter cross direction | 0.104 mm |
| Hole diameter machine direction | 1.05 mm |
| Hole cross-sectional area | 0.085 mm² |
| Holes/cm² | 230 |

Figure 9:
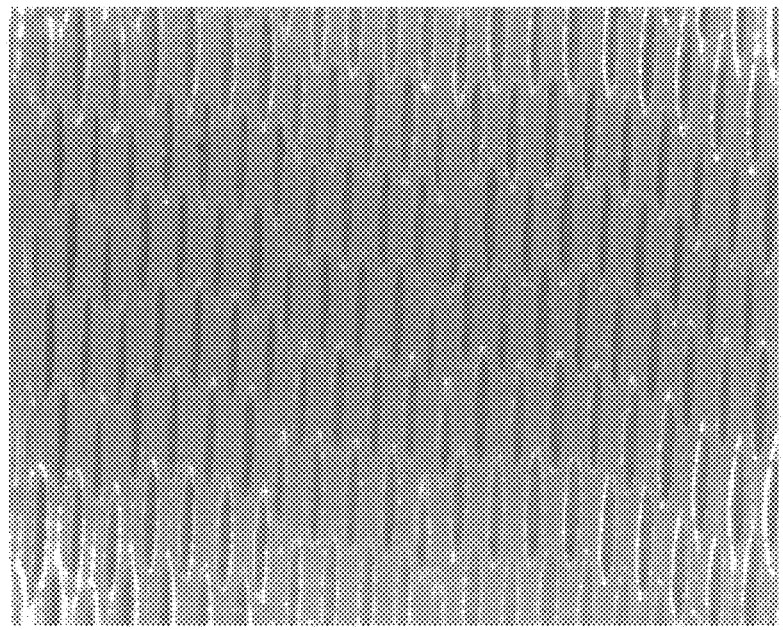
FIG. 9 is an optical digital photo of Example 1 polymeric layer having openings therein.
Figure 10:
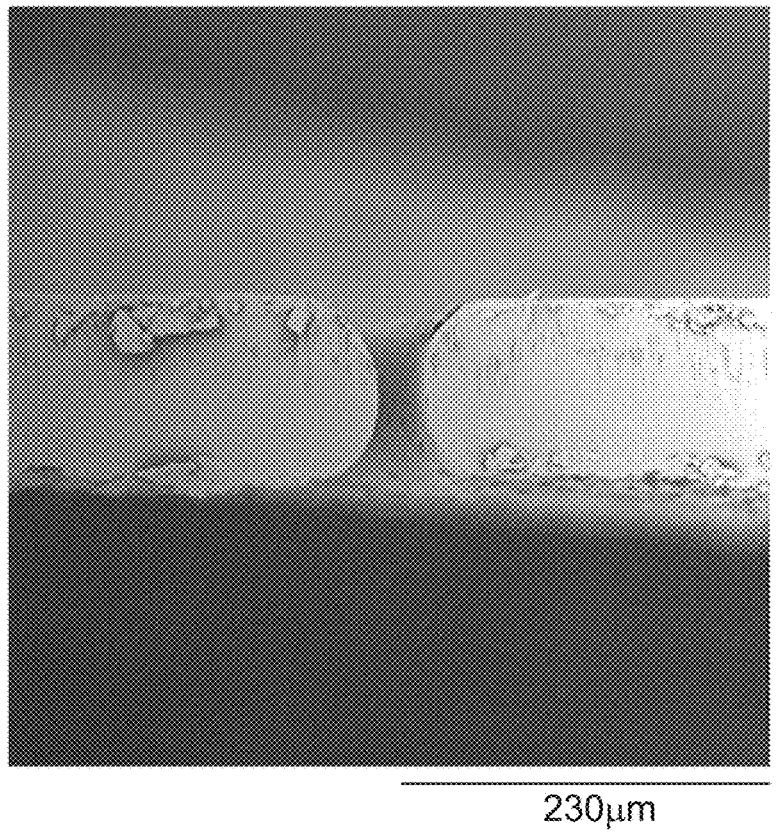
FIG. 10 is a scanning electron digital photomicrograph of the cross-section of one of the holes of the polymeric layer having openings therein shown in FIG. 9.

An optical digital photo at 10× of the resulting polymeric layer is shown in FIG. 9. A scanning electron digital photomicrograph of a cross-section of one of the holes in the resulting polymeric layer is shown in FIG. 10.

Example 2

Example 2 was made as described for Example 1, except the quench takeaway speed was 1.5 m/min.

Using an optical microscope, the dimensions of the resulting polymeric layer having an array of openings between the major surfaces were measured, and are listed below.

| | |
|---|---|
| Layer thickness | 0.110 mm |
| Hole general shape | vesica piscis |
| Hole diameter cross direction | 0.035 mm |
| Hole diameter machine direction | 0.252 mm |
| Hole cross-sectional area | 0.007 mm² |
| Holes/cm² | 472 |

Figure 11:
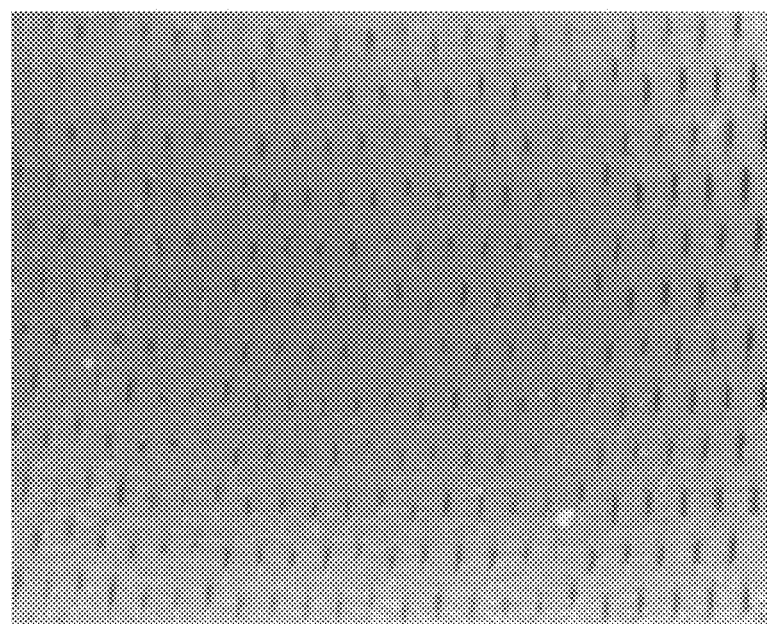
FIG. 11 is an optical digital photo of Example 2 polymeric layer having openings therein.
Figure 12:
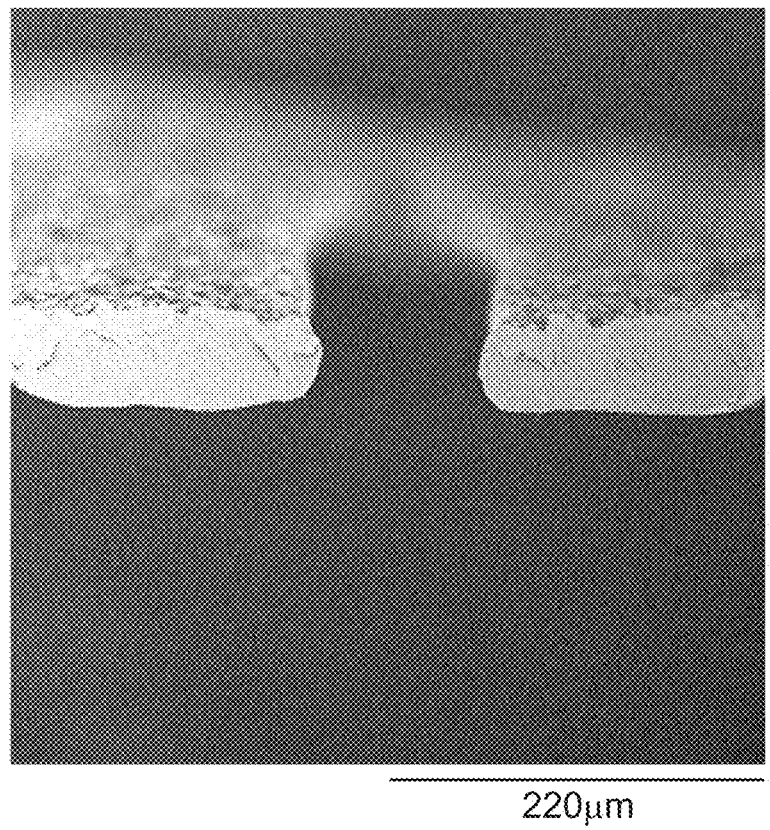
FIG. 12 is a scanning electron digital photomicrograph of the cross-section of one of the holes of the polymeric layer having openings therein shown in FIG. 11.

An optical photograph at 10× of the resulting polymeric layer is shown in FIG. 11. A scanning electron digital photomicrograph of a cross-section of one of the holes in the resulting polymeric layer is shown in FIG. 12.

Example 3

Example 3 was made as described for Example 1, except the quench roll temperature was 24° C.

Using an optical microscope, the dimensions of the resulting polymeric layer having an array of openings between the major surfaces were measured, and are listed below.

| | |
|---|---|
| Layer thickness | 0.100 mm |
| Hole general shape | vesica piscis |
| Hole diameter cross direction | 0.192 mm |
| Hole diameter machine direction | 1.309 mm |
| Hole cross-sectional area | 0.197 mm² |
| Holes/cm² | 235 |

Figure 13:
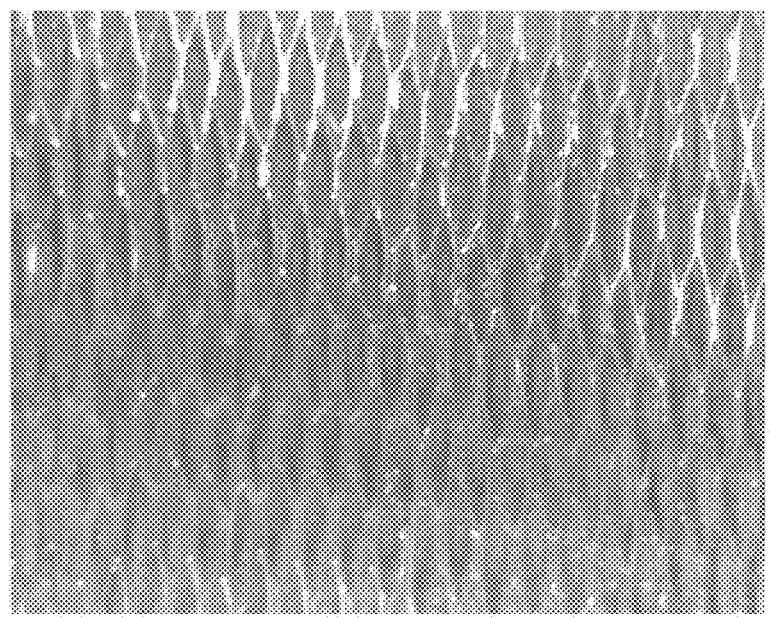
FIG. 13 is an optical digital photo of Example 3 polymeric layer having openings therein.
Figure 14:
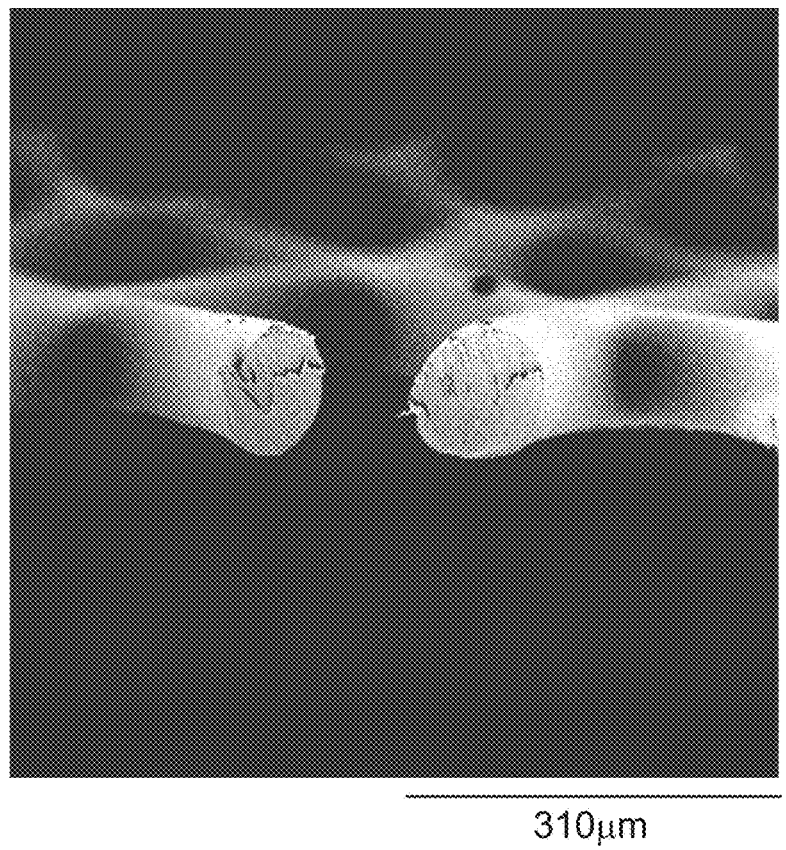
FIG. 14 is a scanning electron digital photomicrograph of the cross-section of one of the holes of the polymeric layer having openings therein shown in FIG. 13.

An optical photograph at 10× of the resulting polymeric layer is shown in FIG. 13. A scanning electron digital photomicrograph of a cross-section of one of the holes in the resulting polymeric layer is shown in FIG. 14.

Example 4

Example 4 was made the same as Example 2 except the quench roll temperature was 24° C.

Using an optical microscope, the dimensions of the resulting polymeric layer having an array of openings between the major surfaces were measured, and are listed below.

| | |
|---|---|
| Layer thickness | 0.175 mm |
| Hole general shape | vesica piscis |
| Hole diameter cross direction | 0.178 mm |
| Hole diameter machine direction | 0.536 mm |
| Hole cross-sectional area | 0.075 mm² |
| Holes/cm² | 491 |

Figure 15:
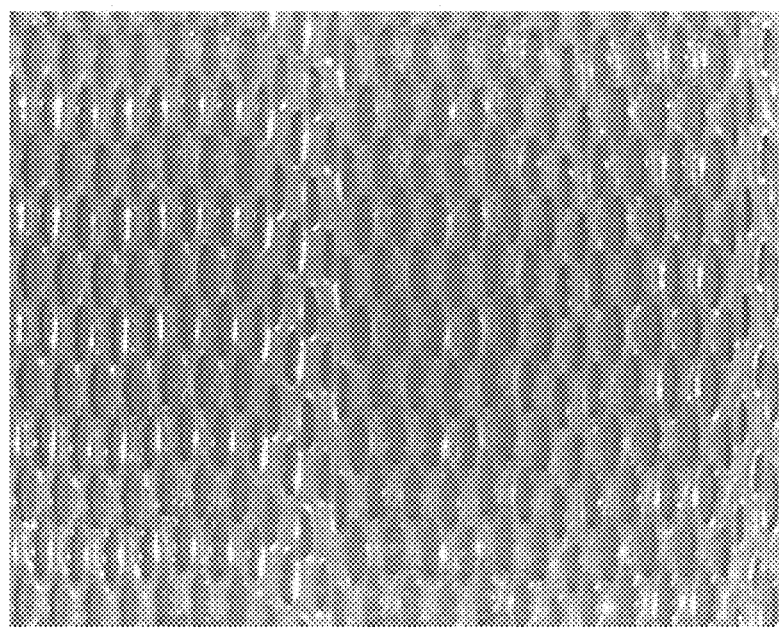
FIG. 15 is an optical digital photo of Example 4 polymeric layer having openings therein.
Figure 16:
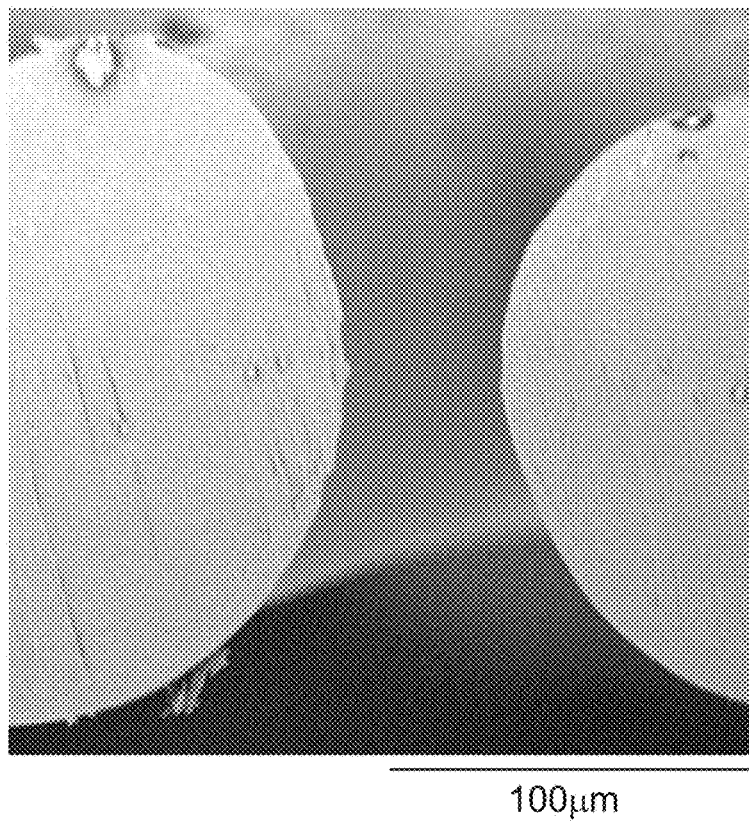
FIG. 16 is a scanning electron digital photomicrograph of the cross-section of one of the holes of the polymeric layer having openings therein shown in FIG. 15.

An optical photograph at 10× of the resulting polymeric layer is shown in FIG. 15. A scanning electron digital photomicrograph of a cross-section of one of the holes in the resulting polymeric layer is shown in FIG. 16.

Example 5

Example 5 was made the same as Example 4 except the polymer melt temperature was raised to 260° C.

Using an optical microscope, the dimensions of the resulting polymeric layer having an array of openings between the major surfaces were measured, and are listed below.

| | |
|---|---|
| Layer thickness | 0.160 mm |
| Hole general shape | vesica piscis |
| Hole diameter cross direction | 0.112 mm |
| Hole diameter machine direction | 0.438 mm |
| Hole cross-sectional area | 0.039 mm² |
| Holes/cm² | 560 |

Figure 17:
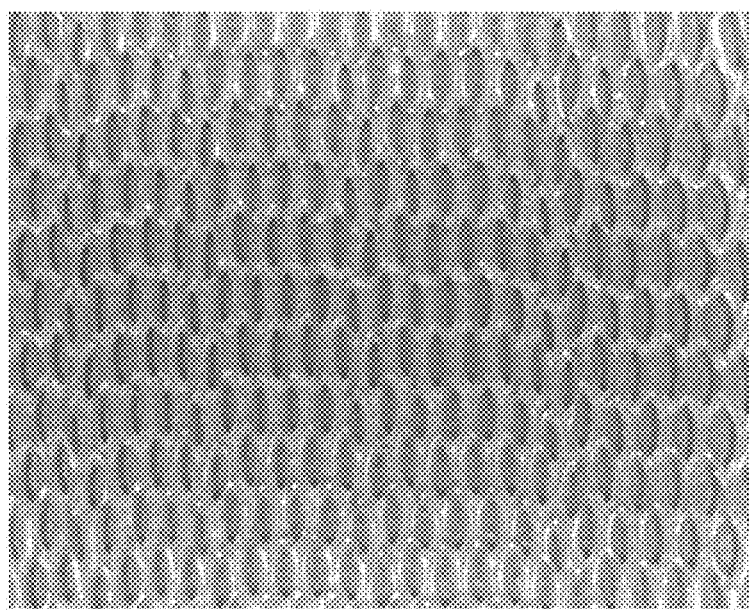
FIG. 17 is an optical digital photo of Example 5 polymeric layer having openings therein.
Figure 18:
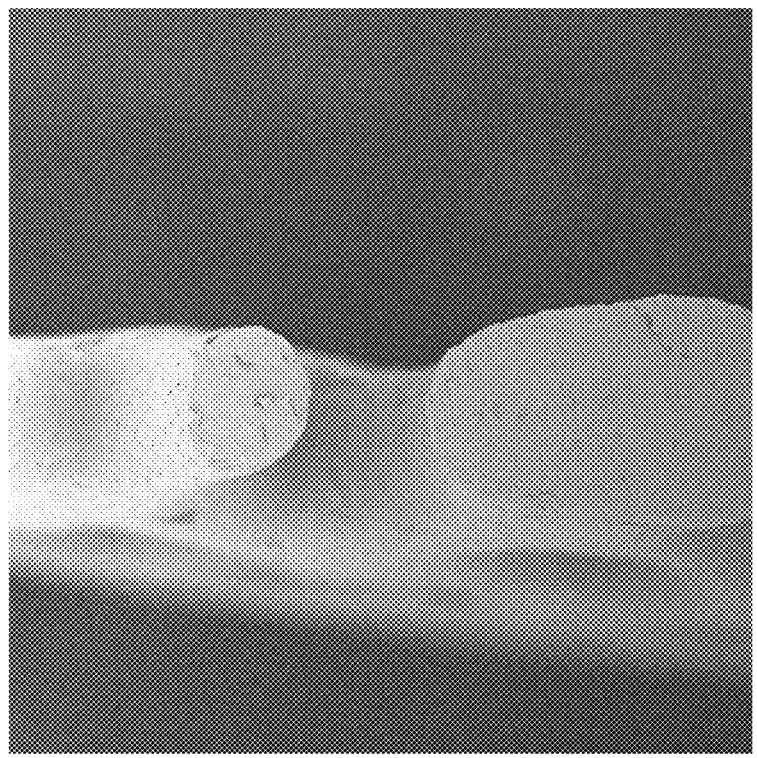
FIG. 18 is a scanning electron digital photomicrograph of the cross-section of one of the holes of the polymeric layer having openings therein shown in FIG. 17.

An optical photograph at 10× of the resulting polymeric layer is shown in FIG. 17. A scanning electron digital photomicrograph of a cross-section of one of the holes in the resulting polymeric layer is shown in FIG. 18.

Example 6

Example 6 was made the same as Example 5 except the quench takeaway speed was 3.1 m/min.

Using an optical microscope, the dimensions of the resulting polymeric layer having an array of openings between the major surfaces were measured, and are listed below.

| | |
|---|---|
| Layer thickness | 0.06 mm |
| Hole general shape | vesica piscis |
| Hole diameter cross direction | 0.129 mm |
| Hole diameter machine direction | 1.095 mm |
| Hole cross-sectional area | 0.111 mm² |
| Holes/cm² | 238 |

Figure 19:
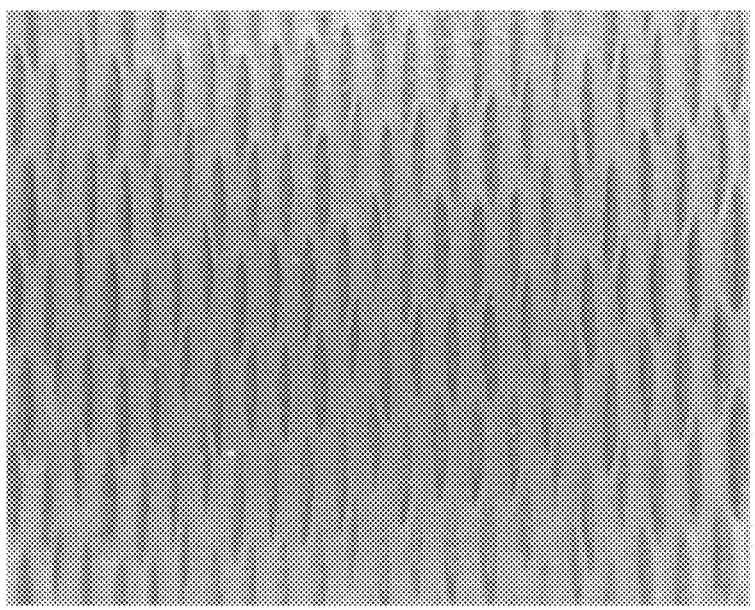
FIG. 19 is an optical digital photo of Example 6 polymeric layer having openings therein.
Figure 20:
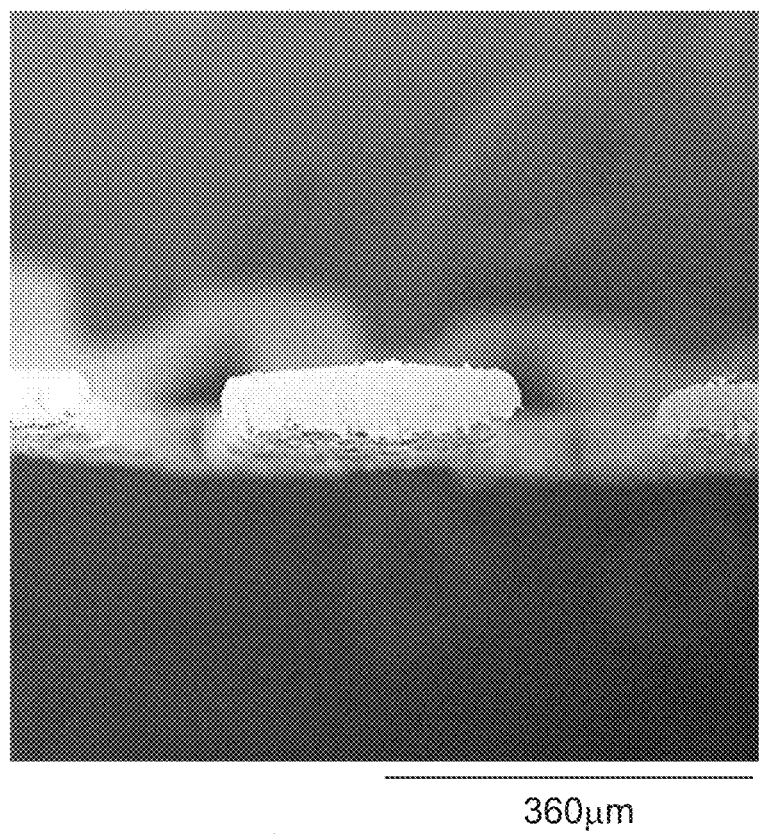
FIG. 20 is a scanning electron digital photomicrograph of the cross-section of one of the holes of the polymeric layer having openings therein shown in FIG. 19.

An optical photograph at 10× of the resulting polymeric layer is shown in FIG. 19. A scanning electron digital photomicrograph of a cross-section of one of the holes in the resulting polymeric layer is shown in FIG. 20.

Example 7

Figure 21:
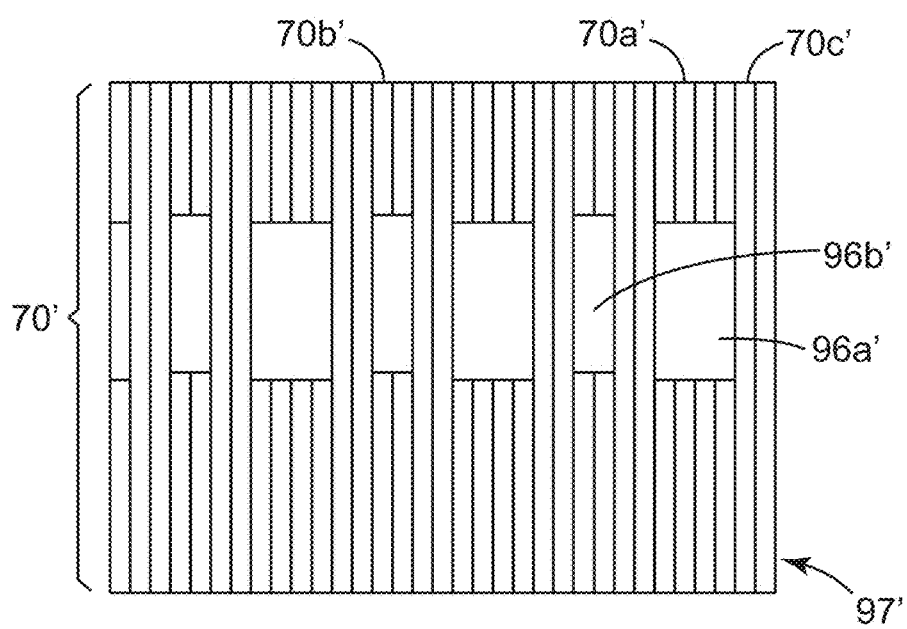
FIG. 21 is a close up front view of the dispensing surface of an extrusion die used in certain of the Examples.

A co-extrusion die as generally depicted in FIG. 3, and assembled with a 10 shim repeating pattern of extrusion orifices as generally illustrated in FIG. 21, was prepared. The thickness of the shims in the repeat sequence was 4 mils (102 mm) for shims 70' with connection to the first cavity, the second cavity, and for the spacers which had no connection to either cavity (70a', 70b' and 70c', respectively). The shims were formed from stainless steel, with perforations cut by a wire electron discharge machining. The height of first and second extrusion orifices 96a' and 96b' was cut to 30 mils (0.762 mm). The extrusion orifices were aligned in a collinear, alternating arrangement, and resulting dispensing surface 97' was as shown generally in FIG. 21. Two spacer shims followed by two shims with connection to the first cavity, followed by two spacer shims, followed by 4 shims with connection to the second cavity comprises the shim stack sequence. The total width of the shim setup was 15 cm.

The inlet fittings on the two end blocks were each connected to a conventional single-screw extruder. A chill roll was positioned adjacent to the distal opening of the co-extrusion die to receive the extruded material. The extruder feeding the first cavity was loaded with thirty-five melt flow index polypropylene pellets ("EXXONMOBIL 3155 PP"). The extruder feeding the second cavity was also loaded with thirty-five melt flow index polypropylene pellets ("ExxonMobil 3155PP").

The melt was extruded vertically into an extrusion quench takeaway nip. The quench nip was a smooth temperature controlled chrome plated 20 cm diameter steel roll and an 11 cm diameter silicone rubber roll. The rubber roll was about 60 durometer. Both were temperature controlled with internal water flow. The nip pressure was generated with 2 pressurized air cylinders. The web path wrapped 180 degrees around the chrome steel roll and then to a windup roll. A schematic view of the quench process in shown in FIG. 1.

Other process conditions are listed below:

| | |
|---|---|
| Orifice width for the first cavity: | 0.204 mm |
| Orifice height for the first cavity: | 0.762 mm |
| Orifice width of the second cavity: | 0.408 mm |
| Orifice height of the second cavity: | 0.762 mm |
| Land spacing between orifices | 0.204 mm |
| Flow rate of first polymer | 1.9 kg/hr. |
| Flow rate of second polymer | 1.5 kg/hr. |
| Extrusion temperature | 232° C. |
| Quench roll temperature | 15° C. |
| Quench takeaway speed | 6.1 m/min. |
| Melt drop distance | 10 cm. |
| Nip Pressure | 0.1 kg/cm |

Using an optical microscope, the dimensions of the resulting polymeric layer having an array of openings between the major surfaces were measured and are shown below.

| | |
|---|---|
| Layer thickness | 0.110 mm |
| Hole general shape | vesica piscis |
| Hole diameter cross direction | 0.211 mm |
| Hole diameter machine direction | 4.55 mm |
| Hole cross-sectional area | 0.754 mm$^2$ |
| Holes/cm$^2$ | 21 |

Figure 22:
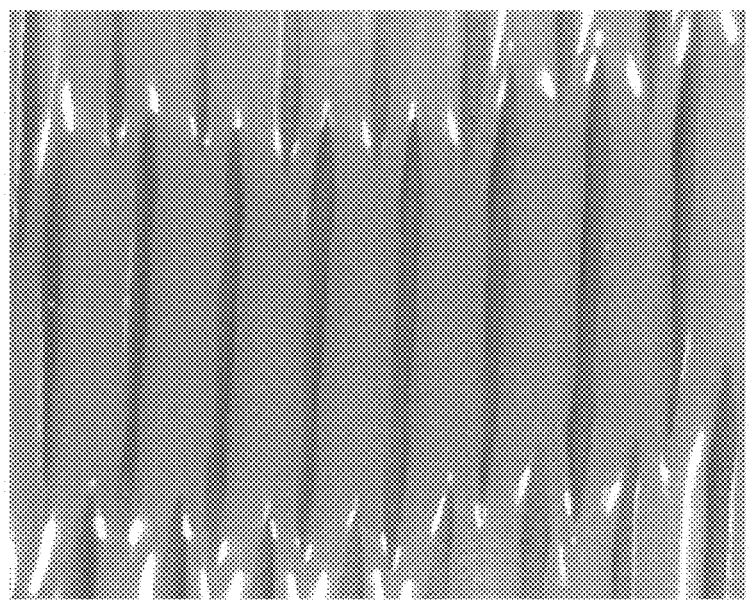
FIG. 22 is an optical digital photo of Example 7 polymeric layer having openings therein.
Figure 23:
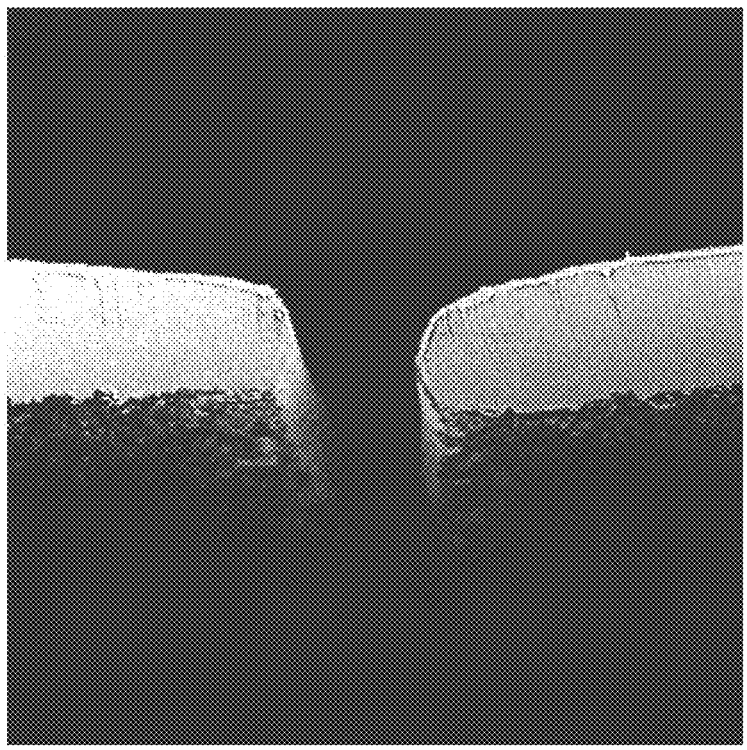
FIG. 23 is a scanning electron digital photomicrograph of the cross-section of one of the holes of the polymeric layer having openings therein shown in FIG. 22.

An optical photograph at 10× of the resulting polymeric layer is shown in FIG. 22. A scanning electron digital photomicrograph of a cross-section of one of the holes in the resulting polymeric layer is shown in FIG. 23.

Example 8

Figure 24:
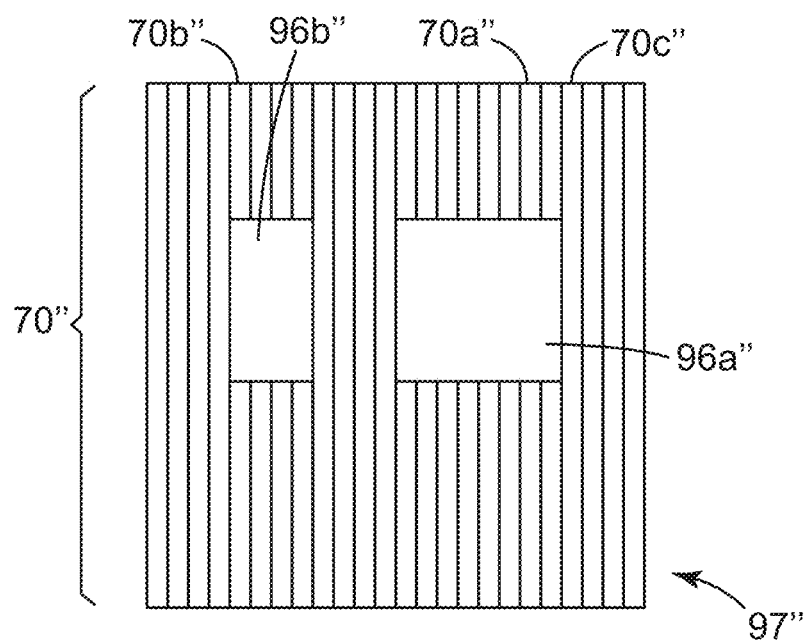
FIG. 24 is a close up front view of the dispensing surface of an extrusion die used in certain of the Examples.

A co-extrusion die as generally depicted in FIG. 3, but assembled with a 20 shim repeating pattern of shims such that the first and second extrusion orifices were aligned in a collinear, alternating arrangement generally as illustrated in FIG. 24, was prepared. The thickness of shims 70" in the repeat sequence was 4 mils (102 mm) for the shims with connection to the first cavity, the second cavity, and for the spacers which had no connection to either cavity (70a", 70b" and 70c", respectively). The shims were formed from stainless steel, with perforations cut by a wire electron discharge machining. The height of first and second extrusion orifices 96a" and 96b" was cut to 30 mils (0.762 mm). Four spacer shims followed by four shims with connection to the first cavity, followed by four spacer shims, followed by eight shims with connection to the second cavity comprises the shim stack sequence. The extrusion orifices were aligned in a collinear, alternating, arrangement, and resulting dispensing surface 97" was as shown generally in FIG. 24. The total width of the shim setup was 15 cm.

The inlet fittings on the two end blocks were each connected to a conventional single-screw extruder. A chill roll was positioned adjacent to the distal opening of the co-extrusion die to receive the extruded material. The extruder feeding the first cavity was loaded with thirty-five melt flow index polypropylene pellets ("EXXONMOBIL 3155 PP"). The extruder feeding the second cavity was also loaded with thirty-five melt flow index polypropylene pellets ("ExxonMobil 3155PP").

The melt was extruded vertically into an extrusion quench takeaway nip. The quench nip was a smooth temperature controlled chrome plated 20 cm diameter steel roll and an 11 cm diameter silicone rubber roll. The rubber roll was about 60 durometer. Both were temperature controlled with internal water flow. The nip pressure was generated with 2 pressurized air cylinders. The web path wrapped 180 degrees around the chrome steel roll and then to a windup roll. A schematic view of the quench process in shown in FIG. 1.

Other process conditions are listed below:

| | |
|---|---|
| Orifice width for the first cavity: | 0.408 mm |
| Orifice height for the first cavity: | 0.762 mm |
| Orifice width of the second cavity: | 0.816 mm |
| Orifice height of the second cavity: | 0.762 mm |
| Land spacing between orifices | 0.408 mm |
| Flow rate of first polymer | 2.1 kg/hr. |
| Flow rate of second polymer | 2.6 kg/hr. |
| Extrusion temperature | 204° C. |
| Quench roll temperature | 15° C. |
| Quench takeaway speed | 3.1 m/min. |
| Melt drop distance | 10 cm. |
| Nip Pressure | 0.1 kg/cm |

Using an optical microscope, the dimensions of the resulting polymeric layer having an array of openings between the major surfaces were measured and are shown below.

| | |
|---|---|
| Layer thickness | 0.46 mm |
| Hole general shape | vesica piscis |
| Hole diameter cross direction | 0.64 mm |
| Hole diameter machine direction | 4.9 mm |
| Hole cross-sectional area | 2.5 mm$^2$ |
| Holes/cm$^2$ | 14 |

Figure 25:
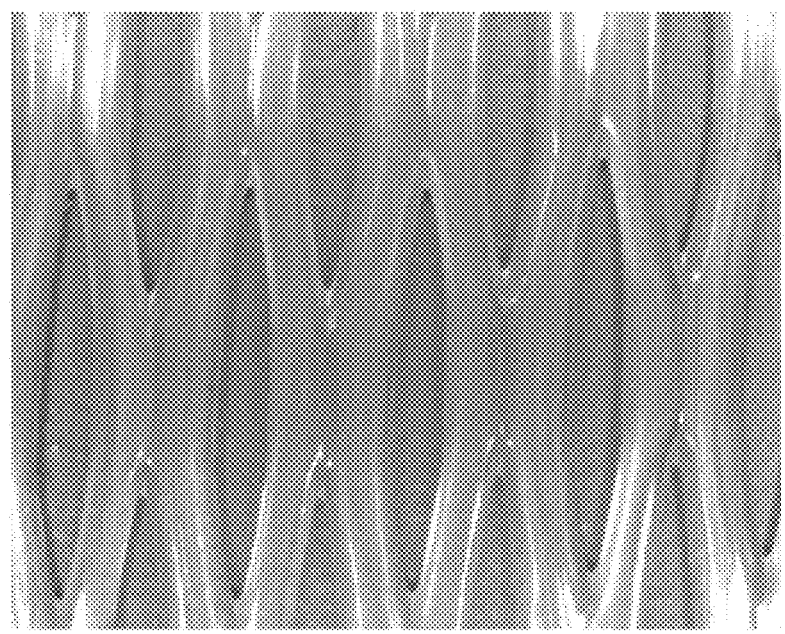
FIG. 25 is an optical digital photo of Example 8 polymeric layer having openings therein.
Figure 26:
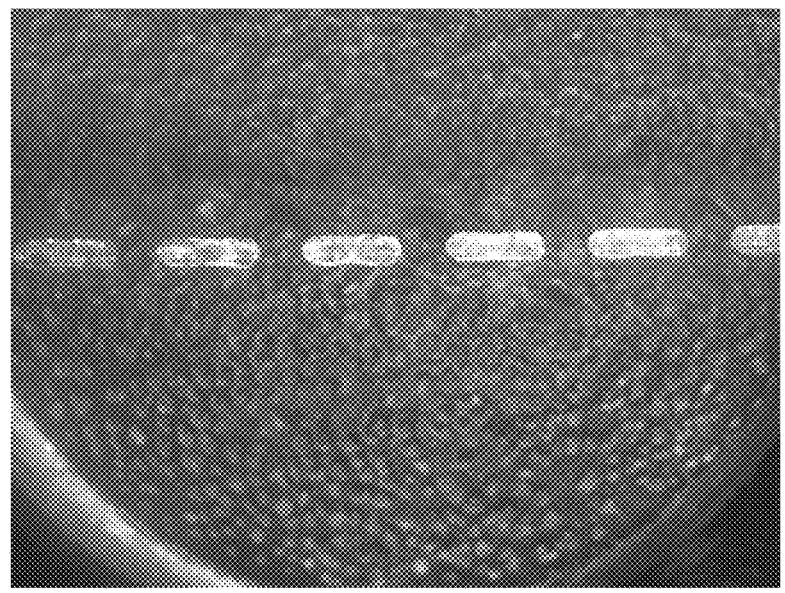
FIG. 26 is a scanning electron digital photomicrograph of the cross-section of one of the holes of the polymeric layer having openings therein shown in FIG. 22.

An optical photograph at 10× of the resulting polymeric layer is shown in FIG. 25. A scanning electron digital photomicrograph of a cross-section of one of the holes in the resulting polymeric layer is shown in FIG. 26.

Example 9

Example 9 was made the same as Example 8 except the quench takeaway speed was 2.4 m/min.

Using an optical microscope, the dimensions of the resulting polymeric layer having an array of openings between the major surfaces were measured and are shown below.

| | |
|---|---|
| Layer thickness | 0.406 mm |
| Hole general shape | vesica piscis |
| Hole diameter cross direction | 0.368 mm |
| Hole diameter machine direction | 3.23 mm |
| Hole cross-sectional area | 0.934 mm$^2$ |
| Holes/cm$^2$ | 15 |

Figure 27:
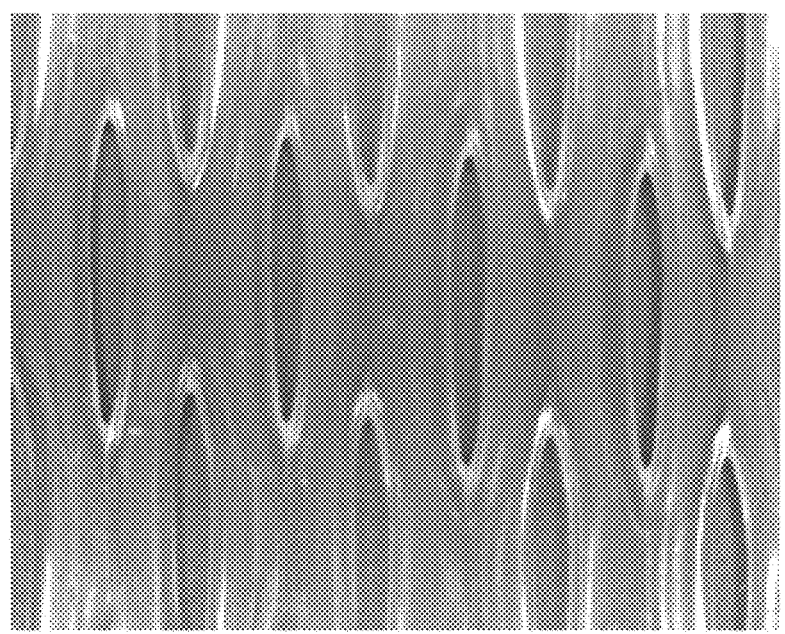
FIG. 27 is an optical digital photo of Example 9 polymeric layer having openings therein.
Figure 28:
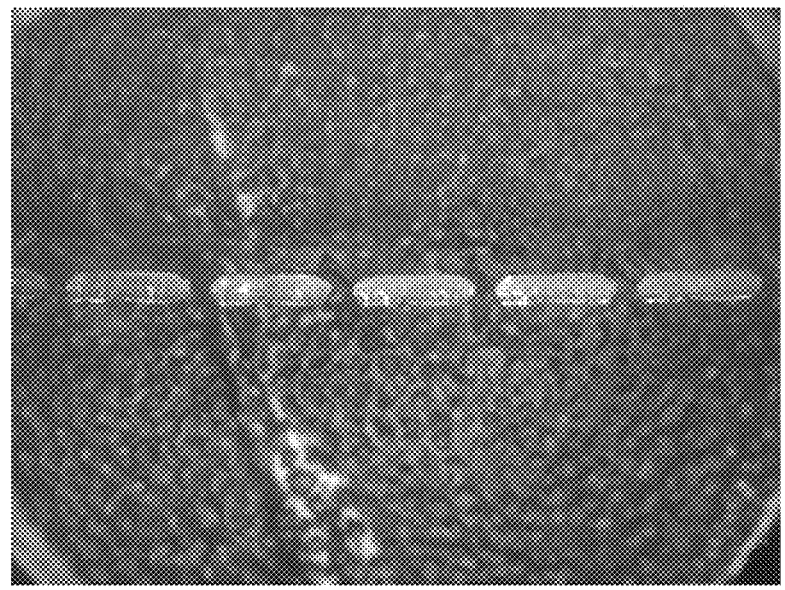
FIG. 28 is a scanning electron digital photomicrograph of the cross-section of one of the holes of the polymeric layer having openings therein shown in FIG. 27.

An optical photograph at 10× of the resulting polymeric layer is shown in FIG. 27. A cross-section of one of the holes in the resulting polymeric layer is shown in FIG. 28.

Example 10

Figure 29:
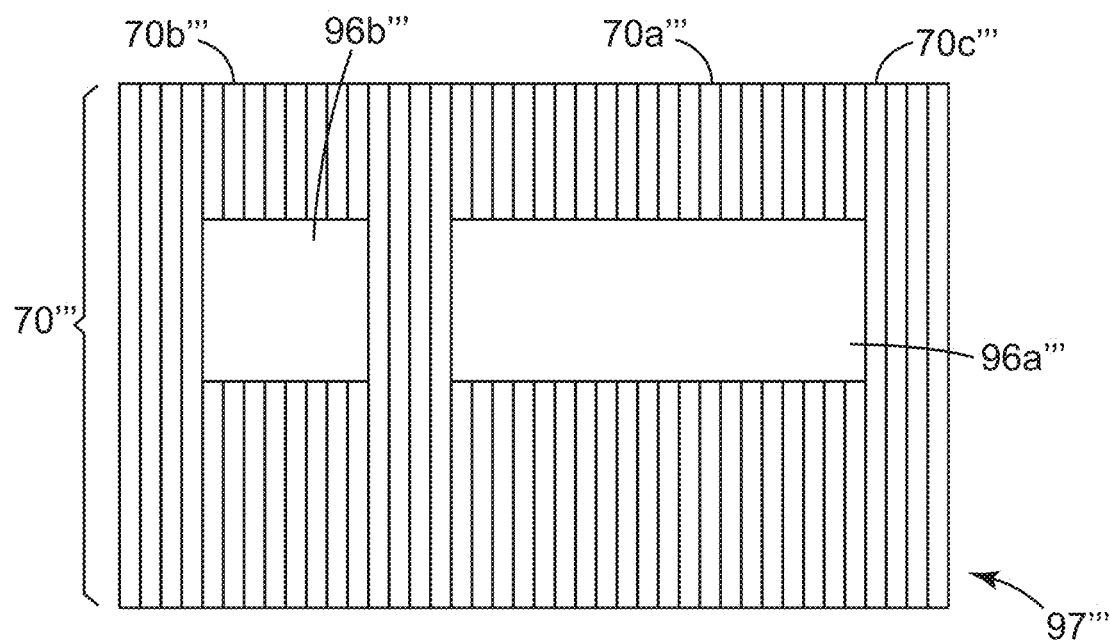
FIG. 29 is a close up front view of the dispensing surface of an extrusion die used in Example 10.

A co-extrusion die as generally depicted in FIG. 3, and assembled with a 36-shim repeating pattern of extrusion orifices 70''' as generally illustrated in FIG. 29, was prepared. The thickness of the shims in the repeat sequence was 4 mils (102 mm) for the shims with connection to the first cavity, the second cavity, and for the spacers which had no connection to either cavity (70a''', 70b''' and 70c''', respectively). The shims were formed from stainless steel, with perforations cut by a wire electron discharge machining. The height of first and second extrusion orifices, 96a''' and 96b''' was cut to 30 mils (0.762 mm). The extrusion orifices were aligned in a collinear, alternating arrangement, and resulting dispensing surface 97''' was as shown generally in FIG. 29. Four spacer shims 70c''' followed by eight shims with connection to second cavity 96b''', followed by four spacer shims 70c''', followed by twenty shims with connection to first cavity 96a''' comprises the shim stack sequence. The total width of the shim setup was 15 cm.

The inlet fittings on the two end blocks were each connected to a conventional single-screw extruder. A chill roll was positioned adjacent to the distal opening of the co-extrusion die to receive the extruded material. The extruder feeding the first cavity was loaded with thirty-five melt flow index polypropylene pellets ("EXXONMOBIL 1024 PP"). The extruder feeding the second cavity was also loaded with thirty-five melt flow index polypropylene pellets ("ExxonMobil 1024 PP").

The melt was extruded vertically into an extrusion quench takeaway nip. The quench nip was a smooth temperature controlled chrome plated 20 cm diameter steel roll and an 11 cm diameter silicone rubber roll. The rubber roll was About 60 durometer. Both were temperature controlled with internal water flow. The nip pressure was generated with 2 pressurized air cylinders. The web path wrapped 180 degrees around the chrome steel roll and then to a windup roll. A schematic view of the quench process in shown in FIG. 1.

Other process conditions are listed below:

| | |
|---|---|
| Orifice width for the first cavity: | 0.408 mm |
| Orifice height for the first cavity: | 0.762 mm |
| Orifice width of the second cavity: | 2.032 mm |
| Orifice height of the second cavity: | 0.762 mm |
| Land spacing between orifices | 0.306 mm |
| Flow rate of first polymer | 0.95 kg/hr. |
| Flow rate of second polymer | 0.9 kg/hr. |
| Extrusion temperature | 218° C. |
| Quench roll temperature | 15° C. |
| Quench takeaway speed | 1.4 m/min. |
| Melt drop distance | 10 cm. |
| Nip Pressure | 0.1 kg/cm |

Using an optical microscope, the dimensions of the resulting polymeric layer having an array of openings between the major surfaces were measured and are shown below.

| | |
|---|---|
| Layer thickness | 0.28 mm |
| Hole general shape | vesica piscis |
| Hole diameter cross direction | 0.245 mm |
| Hole diameter machine direction | 2.06 mm |
| Hole cross-sectional area | 0.396 mm$^2$ |
| Holes/cm$^2$ | 16 |

Figure 30:
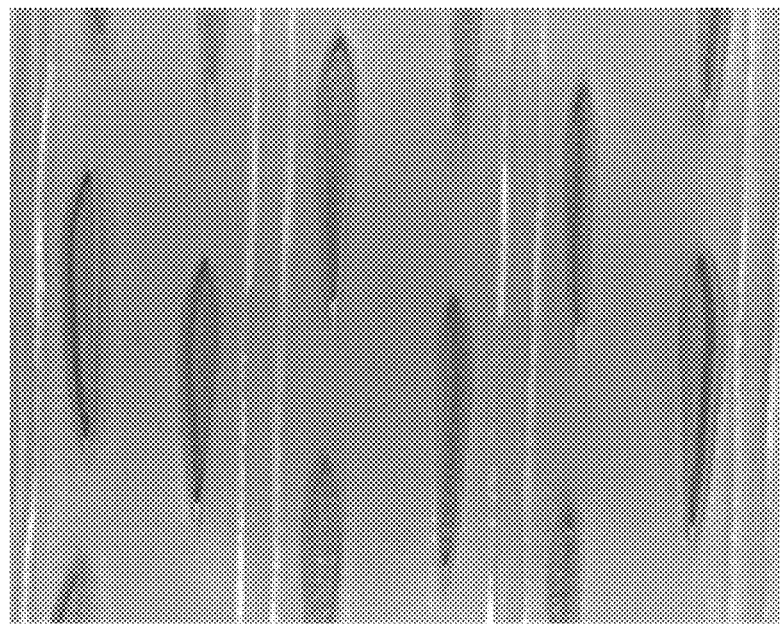
FIG. 30 is an optical digital photo of Example 10 polymeric layer having openings therein.

An optical photograph at 10× of the resulting polymeric layer is shown in FIG. 30.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A method of making a polymeric layer having first and second, generally opposed, parallel major surfaces, comprising an array of openings extending between the first and second major surfaces, wherein the openings vary in size and shape and have a cross-section with two opposed, pointed ends, wherein the openings each have a series of areas through the openings from the first and second major surfaces ranging from minimum to maximum areas, wherein there is a total area and a total open area for each of the first and second major surfaces, wherein the total open area for each of the first and second major surfaces is not greater than 50 percent of the total area of the respective major surface, and wherein for at least a majority of the openings, the minimum area is not at either major surface, the method comprising at least one of passing through a nip or calendaring netting comprising an array of collinear polymeric strands, wherein exterior surfaces of the collinear polymeric strands are periodically joined together at bond regions throughout the array to form a random arrangement of open regions, wherein the netting has a thickness up to 2 mm, and wherein the collinear polymeric strands do not substantially cross over each other, such that the random arrangement of open regions forms the openings in the polymeric layer.

2. The method of claim 1, wherein the total open area for each of the first and second major surfaces is in a range from 0.1 percent to not greater than 50 percent of the total area of the respective major surface.

3. The method of claim 1, wherein the total open area for each of the first and second major surfaces is not greater than 1 percent of the total area of the respective major surface.

4. The method of claim 1, wherein the polymeric layer comprises from 50,000 to 6,000,000 openings/m$^2$.

5. The method of claim 1, wherein the openings have a length and a width, and a ratio of lengths to widths in a range from 1:1 to 1.9:1.

6. The method of claim 1, wherein the polymeric layer has a thickness up to 2 mm.

7. The method of claim 1, wherein at least some of the openings have a first side on the first major surface comprising a first polymeric material and a second, opposed side on the first major surface comprising a second, different polymeric material.

8. A method of making polymeric layer having first and second, generally opposed, parallel major surfaces, comprising an array of openings extending between the first and second major surfaces, wherein the openings vary in size and shape and have a cross-section with two opposed, pointed ends, wherein the openings each have a series of areas through the openings from the first and second major surfaces ranging from minimum to maximum areas, wherein for at least a majority of the openings, the area of each opening is not greater than is 5 mm², and wherein for at least a majority of the openings, the minimum area is not at either major surface, the method comprising at least one of passing through a nip or calendaring netting comprising an array of collinear polymeric strands, wherein exterior surfaces of the collinear polymeric strands are periodically joined together at bond regions throughout the array to form a random arrangement of at least one of diamond-shaped or hexagonal-shaped open regions, wherein the netting has a thickness up to 2 mm, and wherein the collinear polymeric strands do not substantially cross over each other, such that the open regions form the openings in the polymeric layer.

9. The method of claim 8, wherein the polymeric layer comprises from 50,000 to 6,000,000 openings/m².

10. The method of claim 8, wherein the openings have a length and a width, and a ratio of lengths to widths in a range from 1:1 to 1.9:1.

11. The method of claim 8, wherein the polymeric layer has a thickness up to 2 mm.

12. The method of claim 8, wherein the polymeric layer is a sheet having an average thickness in a range from 250 micrometers to 5 mm.

13. The method of claim 8, wherein at least some of the openings have a first side on the first major surface comprising a first polymeric material and a second, opposed side on the first major surface comprising a second, different polymeric material.

* * * * *

UNITED STATES PATENT AND TRADEMARK OFFICE
CERTIFICATE OF CORRECTION

| | | |
|---|---|---|
| PATENT NO. | : 10,449,700 B2 | Page 1 of 1 |
| APPLICATION NO. | : 15/269223 | |
| DATED | : October 22, 2019 | |
| INVENTOR(S) | : Ronald Ausen et al. | |

It is certified that error appears in the above-identified patent and that said Letters Patent is hereby corrected as shown below:

In the Specification

<u>Column 1</u>
Lines 28-29, Delete "needlepunching." and insert -- needle punching. --, therefor.

<u>Column 8</u>
Line 35 (Approx.), After "g/m2)" insert -- . --.

<u>Column 10</u>
Line 35, After "6B" insert -- . --.

In the Claims

<u>Column 19</u>
Line 1, In Claim 8, delete "mm2 ," and insert -- mm2, --, therefor.

Signed and Sealed this
Seventh Day of July, 2020

Andrei Iancu
*Director of the United States Patent and Trademark Office*